US011706304B1

(12) United States Patent
Iwanek et al.

(10) Patent No.: US 11,706,304 B1
(45) Date of Patent: Jul. 18, 2023

(54) SYSTEM FOR SETTING AND CONTROLLING FUNCTIONALITIES OF MOBILE DEVICES

(71) Applicant: Mobile Heartbeat, LLC, Waltham, MA (US)

(72) Inventors: Michael Vincent George Iwanek, Cambridge, MA (US); Sajikumar Aravind, Burlington, MA (US)

(73) Assignee: MOBILE HEARTBEAT, LLC, Waltham, MA (US)

( * ) Notice: Subject to any disclaimer, the term of this patent is extended or adjusted under 35 U.S.C. 154(b) by 233 days.

(21) Appl. No.: 17/150,400

(22) Filed: Jan. 15, 2021

Related U.S. Application Data

(63) Continuation of application No. 15/719,331, filed on Sep. 28, 2017, now Pat. No. 10,897,519, which is a (Continued)

(51) Int. Cl.
*H04L 67/306* (2022.01)
*H04L 67/10* (2022.01)
(Continued)

(52) U.S. Cl.
CPC .......... *H04L 67/306* (2013.01); *G06F 3/0482* (2013.01); *G06F 3/0484* (2013.01); *H04L 67/10* (2013.01); *H04L 67/535* (2022.05)

(58) Field of Classification Search
None
See application file for complete search history.

(56) References Cited

U.S. PATENT DOCUMENTS

| 8,615,413 B2 | 12/2013 | McKee et al. |
| 8,918,738 B2 | 12/2014 | Yoshitomi et al. |

(Continued)

FOREIGN PATENT DOCUMENTS

| EP | 3105735 A1 | 12/2016 |
| WO | 2013/176758 A1 | 11/2013 |

OTHER PUBLICATIONS

Application No. EP15749628.2, Office Action, dated Jul. 14, 2022, 9 pages.
(Continued)

*Primary Examiner* — Toan H Vu
(74) *Attorney, Agent, or Firm* — Kilpatrick Townsend & Stockton LLP

(57) ABSTRACT

A system for presenting a clinical process of a patient in a clinical facility having a network, a system backend communicable with the network, and at least one mobile device communicable with the system backend, the mobile device comprising a mobile processor and a display, the mobile processor configured to operate in at least one first user interface mode and at least one second user interface mode, where the mobile processor is configured to enable the operation of at least one built-in function when operating in the at least one first user interface mode and where the mobile processor is configured to disable the operation of the at least one built-in function when operating in the at least one second user interface mode. The mobile processor operating in the at least one second user interface mode is configured to present a list of one or more patients each with a corresponding clinical process, each patient listing configured to re-enable access to the at least one built-in function associated with the corresponding clinical process of the listed patient.

20 Claims, 25 Drawing Sheets

Related U.S. Application Data continuation of application No. 14/621,281, filed on Feb. 12, 2015, now Pat. No. 9,807,195.

(60) Provisional application No. 61/939,104, filed on Feb. 12, 2014.

(51) Int. Cl.
*G06F 3/0482* (2013.01)
*G06F 3/0484* (2022.01)
*H04L 67/50* (2022.01)

(56) References Cited

U.S. PATENT DOCUMENTS

| | | | |
|---|---|---|---|
| 9,058,410 B2 | 6/2015 | McKee et al. | |
| 9,158,399 B2 | 10/2015 | Lu | |
| 9,652,562 B2* | 5/2017 | Barrus | G06F 17/40 |
| 9,715,360 B2* | 7/2017 | Shimizu | H04L 67/02 |
| 9,760,682 B2 | 9/2017 | Mark | |
| 9,807,195 B2 | 10/2017 | Mark | |
| 9,904,777 B2 | 2/2018 | Mark | |
| 10,742,634 B1* | 8/2020 | Shahbazi | H04W 12/77 |
| 10,897,519 B2 | 1/2021 | Iwanek et al. | |
| 2004/0225880 A1* | 11/2004 | Mizrah | G06F 21/46 |
| | | | 713/155 |
| 2005/0080863 A1 | 4/2005 | Daniell | |
| 2009/0276487 A1* | 11/2009 | Jensen | G16H 20/60 |
| | | | 709/203 |
| 2010/0076988 A1* | 3/2010 | Kenedy | G06Q 30/02 |
| | | | 707/E17.005 |
| 2010/0305972 A1 | 12/2010 | McLaren | |
| 2011/0010195 A1 | 1/2011 | Cohn | |
| 2011/0047135 A1 | 2/2011 | Vizethann et al. | |
| 2011/0190930 A1 | 8/2011 | Hanrahan | |
| 2012/0084773 A1 | 4/2012 | Lee | |
| 2012/0197660 A1 | 8/2012 | Prodanovich | |
| 2012/0203571 A1 | 8/2012 | Crapo et al. | |
| 2012/0259655 A1 | 10/2012 | Madreperla | |
| 2013/0054467 A1 | 2/2013 | Dala | |
| 2013/0167111 A1 | 6/2013 | Moore et al. | |
| 2013/0218594 A1 | 8/2013 | Skocic | |
| 2013/0298082 A1* | 11/2013 | Soffer | G06F 3/0482 |
| | | | 715/835 |
| 2014/0000605 A1* | 1/2014 | Steinhauer | A61M 16/026 |
| | | | 128/204.21 |
| 2014/0006041 A1* | 1/2014 | Steinhauer | G16H 40/63 |
| | | | 705/2 |
| 2014/0067007 A1 | 3/2014 | Drees et al. | |
| 2014/0184408 A1 | 7/2014 | Herbst et al. | |
| 2014/0195926 A1 | 7/2014 | Hussain | |
| 2014/0304005 A1 | 10/2014 | Hughes et al. | |
| 2014/0337053 A1 | 11/2014 | Smith | |
| 2014/0344922 A1 | 11/2014 | Lam | |
| 2015/0073815 A1 | 3/2015 | Holmes et al. | |
| 2015/0150457 A1 | 6/2015 | Wu et al. | |
| 2015/0195399 A1* | 7/2015 | Way | H04W 60/04 |
| | | | 455/26.1 |
| 2015/0205930 A1 | 7/2015 | Shaanan | |
| 2016/0034668 A1* | 2/2016 | Rourke | G16H 10/60 |
| | | | 705/2 |
| 2016/0110507 A1 | 4/2016 | Abbo | |
| 2016/0110523 A1 | 4/2016 | Francois | |
| 2016/0239619 A1 | 8/2016 | Abou | |
| 2019/0026464 A1 | 1/2019 | Nalluri | |
| 2019/0158654 A1* | 5/2019 | Way | H04W 52/0254 |
| 2019/0340386 A1* | 11/2019 | Godwin | G16H 10/60 |

OTHER PUBLICATIONS

Extended European Search Report dated Jun. 7, 2019 in related foreign application No. EP 15749628.2, 18 pgs.
International Search Report, International Application No. PCT/US15/15711, dated Jul. 8, 2015, all pgs.
Office Action dated Oct. 29, 2020 in related foreign application No. EP 15749628.2, all pgs.

* cited by examiner

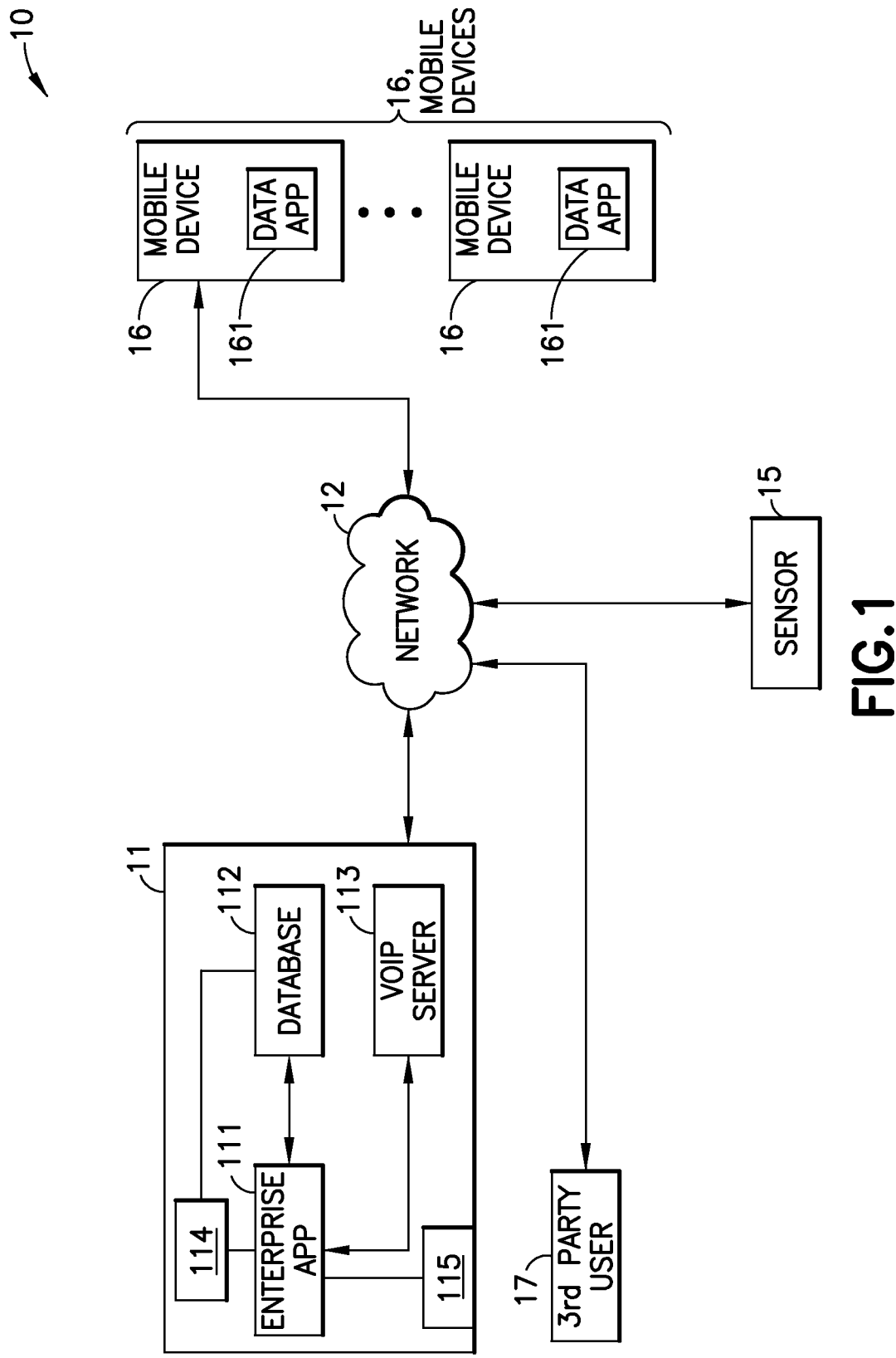

Manage Devices

| Authorize All | Authorized: [...] ▼ | Type: [...] ▼ | Last: [...] ▼ | Serial#, IP of Last User | Search | | | | |
|---|---|---|---|---|---|---|---|---|---|
| SERIAL# | NAME | MODEL | IP | SHARED | MH | LAST USER | LAST HEARD | AUTH | |
| C8WH2SF5DT9V | Swetha Karna | iPhone | 10.10.7.51 | YES | 7.8.3.71 | kdhmd1 | 0:01 | ▼ | Update Delete |
| F78LBKF6FFHG | MH QA 5C-1 | iPhone | 10.10.7.65 | YES | 7.8.3.71 | td3 | 0:02 | ▼ | Update Delete |
| F2LJT64YDTTN | MH Test 04 | iPhone | 10.10.7.86 | YES | 7.8.0.70 | md1 | 0:03 | ▼ | Update Delete |
| DNRK285MDTTP | MH Test 11 | iPhone | 10.10.7.35 | YES | 7.8.0.777 | d4 | 0:03 | ▼ | Update Delete |
| C38JD1W8F8H4 | MH_QA_iPhone5_4/5 | iPhone | 10.10.7.27 | NO | 7.8.0.70 | pd1 | 0:03 | ▼ | Update Delete |
| F73L8AVXFFHG | iPhone | iPhone | 10.10.7.65 | NO | 7.8.0.70 | pd2 | 0:03 | ▼ | Update Delete |
| DNPK3JTKDTTN | MH Test 10 | iPhone | 10.10.7.62 | YES | 7.8.3.71 | kdhn1 | 0:03 | ▼ | Update Delete |
| DNPLFFWZFF9V | iPhone | iPhone | 10.10.7.34 | NO | 7.8.0.70 | swetha | 0:04 | ▼ | Update Delete |
| C38K29Q1DTTN | Brian's iPhone 5 | iPhone | 192.168.1.6 | YES | 7.8.3.71 | kdhn1 | 0:05 | ▼ | Update Delete |
| 79103N4UA4S | MH_QA_4_1/5 | iPhone | 192.168.1.179 | NO | 7.8.0.70 | d4 | 0:07 | ▼ | Update Delete |
| DNPJVL4YDTTN | QA iOS 7 personal | iPhone | 10.10.7.63 | YES | 7.8.3.71 | kdhn2 | 0:07 | ▼ | Update Delete |
| DQGW0FPDT9Y | iPhone | iPhone | 10.10.7.52 | YES | 7.8.3.71 | kdhn3 | 0:07 | ▼ | Update Delete |

FIG. 12

Edit Security Group — 1300

Security Group Name* [Admin_System_Generated] — 1301
Description [System generated admin security group. Plea] — 1302

Permissions

Clinical

Clinical data access [Clinical and Non-Clinical ▸] — 1303

Can set my patient [No ▸] — 1304
Can do staff assignments [No ▸] — 1305
Can confirm lab orders [No ▸] — 1306
Patient Photography [View, Take and Delete Photos ▸] — 1307
Patient Billing [Bill items and access to billing management ▸] — 1308
On Call/Consult Enabled [No ▸] — 1309
Can receive nurse calls and escalations [No ▸] — 1310
User can silence all telemetry alerts for a patient [No ▸] — 1311

FIG.13

SYSTEM FOR SETTING AND CONTROLLING FUNCTIONALITIES OF MOBILE DEVICES

RELATED APPLICATIONS

This application is a continuation of U.S. patent application Ser. No. 15/719,331, filed Sep. 28, 2017, which a continuation of U.S. patent application Ser. No. 14/621,281, filed Feb. 12, 2015, now U.S. Pat. No. 9,807,195, which claims benefit to and is the nonprovisional of U.S. Provisional Patent Application No. 61/939,104, filed Feb. 12, 2014, the disclosures of which are incorporated herein by reference in their entirety.

FIELD

The present embodiments relate a system for setting and controlling the functionalities of mobile devices, more particularly, a system for setting and controlling functionalities of mobile devices that presents process pathways for a patient or clinical pathway or work with mobile device functionalities and data usage that is associated with a specific process pathway.

BACKGROUND

Generally, enterprises that revolve around any sort of physical work, job or tasks commonly rely on organization and management that are conventional in nature. This may include, for instance, using dedicated terminals for data entry and to manage workflows. Few systems for managing workflows include communications and functional capabilities provided by the latest generation mobile devices with powerful functionalities such as a sophisticated display, data communication, multimedia data and file creation and control. Integrating such mobile devices into the enterprise and business environment is a complex task. A simplified means of defining mobile device functionalities with respect to controlling a process pathway may be advantageous. This is especially true in the hospital or clinical other clinical facility, where the process pathways pertains to patients or receivers of care in a hospital or clinical context. The integration of mobile devices in a system for controlling physical process (for example, those related to a patient and a corresponding clinical pathway) pathways for physical tasks, jobs or work may also be advantageous for situations where the mobile devices may be leveraged for controlling tasks of a process pathway, enabling entry of data by a user over a network as well as other activities.

BRIEF DESCRIPTION OF THE DRAWINGS

The foregoing aspects and other features of the present disclosed embodiment are explained in the following description, taken in connection with the accompanying drawings, wherein:

FIG. 1 is a schematic representation illustrating an overview of the system utilizing a system for setting and controlling the functionalities of mobile devices.

FIG. 12 is an exemplary user interface for managing mobile devices.

FIG. 13 is an exemplary user interface for editing security group permissions.

DETAILED DESCRIPTION OF THE EXEMPLARY EMBODIMENTS

The disclosed embodiments generally provides for a system for controlling and presenting process pathways. Generally, when in an environment where multiple process workflow pathways are being tracked, there may be a desire for controlling and presenting the process workflow pathways. The presentation of the multiple process workflow pathways is enhanced by organizing the process workflow pathways by providing a representation for each process workflow pathway. In a hospital or clinical facility context, for example, the representation of each process workflow pathway is presented in the form of a patient module. The patient module is represented by a listed patient element. For the purposes of simplicity, listed patient elements refer to an element from a list of patients generated by the system.

Figure 1A:
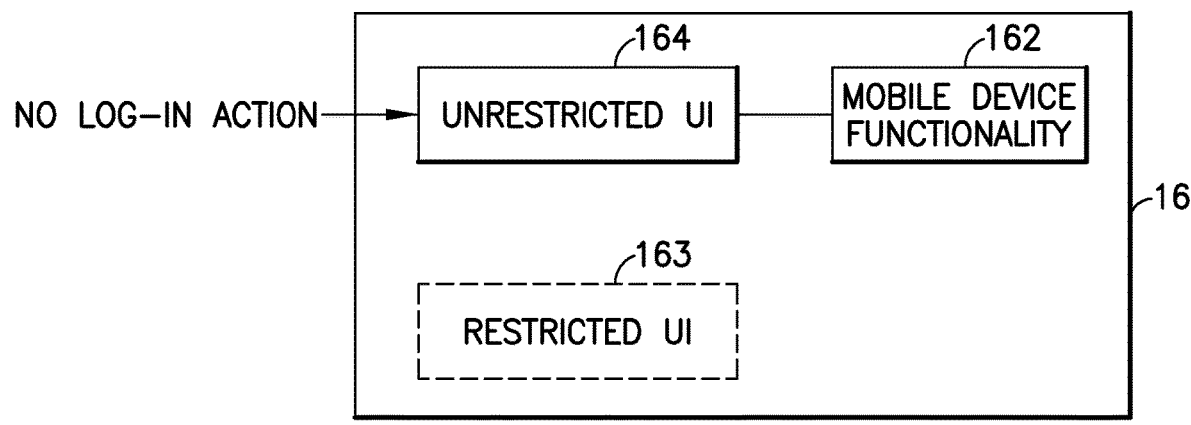
FIG. 1A is a block diagram representing an overview of the user interface modes.
Figure 1B:
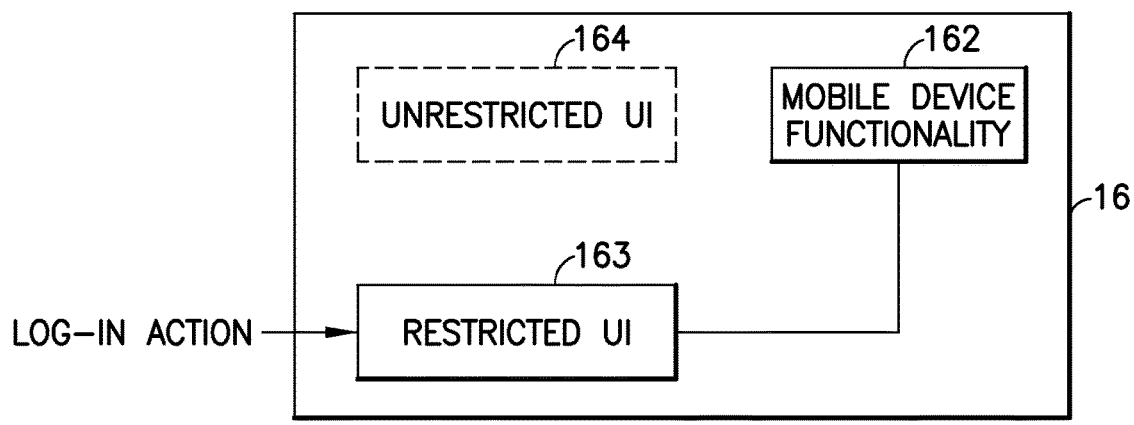
FIG. 1B is a block diagram representing an overview of the user interface modes.
Figure 1C:
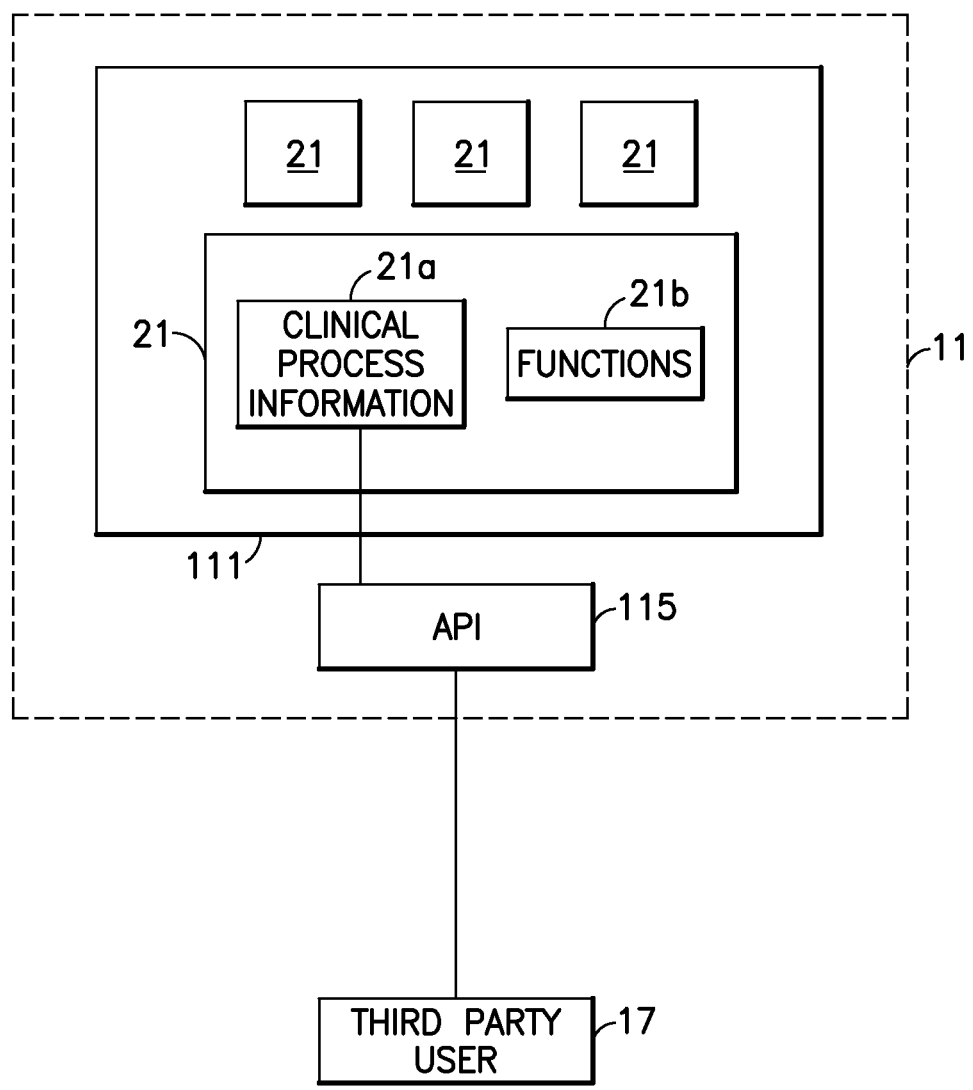
FIG. 1C is a block diagram representing an overview of an API.
Figure 1D:
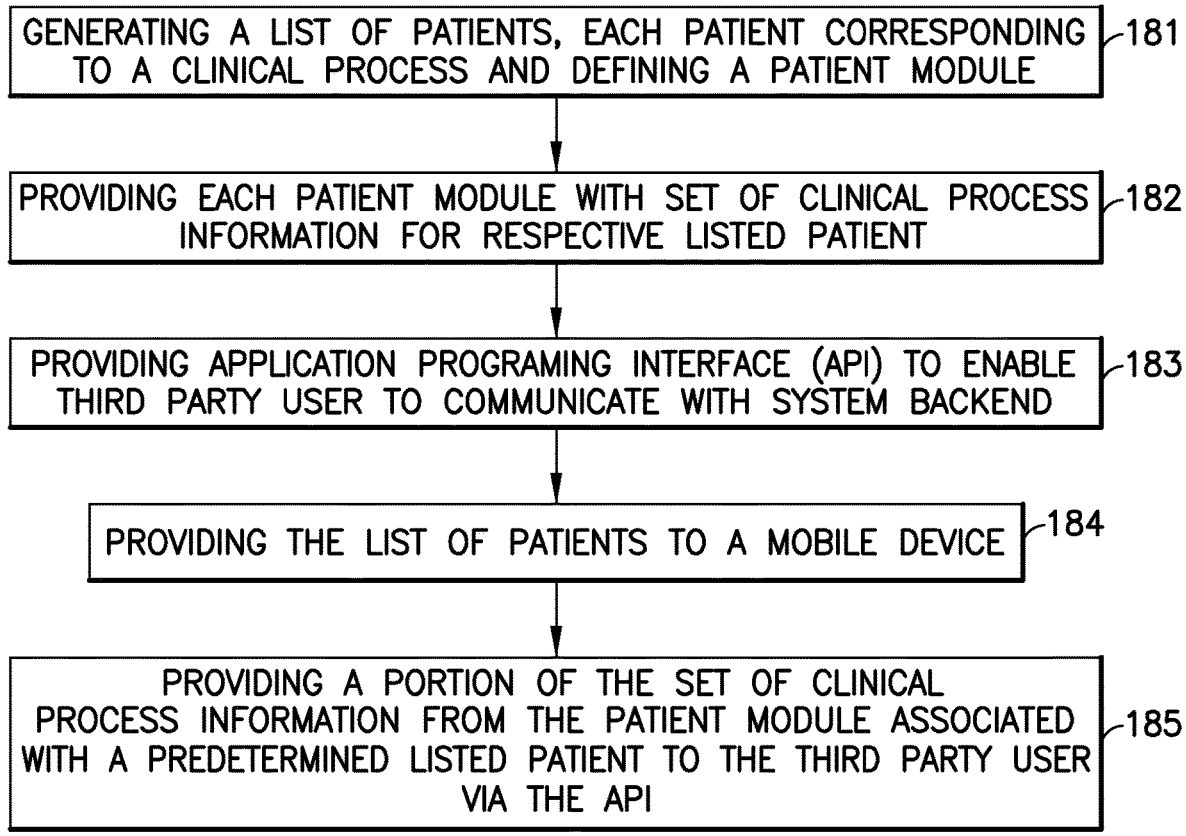
FIG. 1D is a flow diagram illustrating the operations of the API.
Figure 1E:
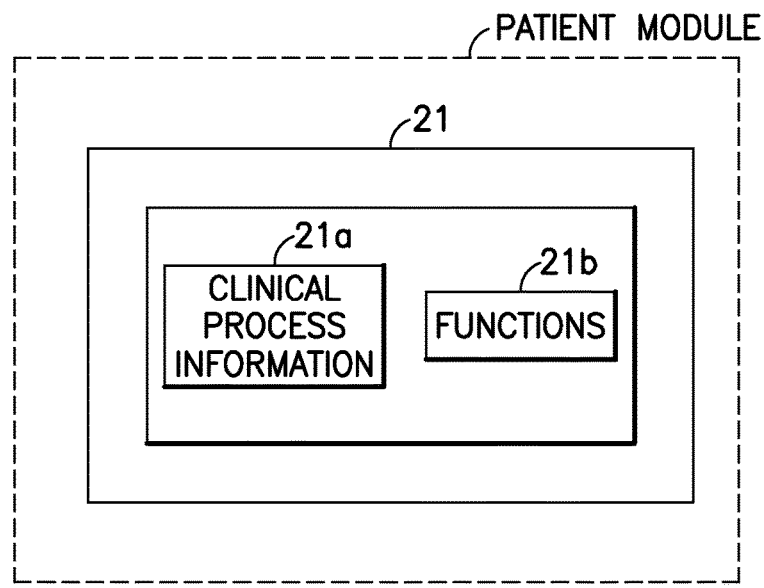
FIG. 1E is a simple block illustrating a patient module.

Referring briefly to FIG. 1E, for descriptive purposes, the patient module (shown in phantom) is representation of a patient comprising clinical process information and data associated with that patient within a hospital or clinical facility. Each patient module is represented by a listed patient element 21 and defines and encompasses a set of clinical process information 21a pertaining to a patient within the hospital or clinical facility environment. The clinical process information includes the process workflow pathway that corresponds to the process workflow pathway generated for a corresponding patient. These process workflow pathways may also be referred to as process pathways, jobs, projects, or clinical processes in reference to a patient or any other suitable language describing a pathway corresponding to a set of physical work activities related to a set of tasks (a set may include one or more) to be performed to achieve a certain result. The clinical process information 21a of each patient module also includes information and data pertaining to the corresponding patient. For example, the clinical process information 21a includes all data or information related to a corresponding patient such as, for example, laboratory data, billing data, diagnostic data, or any other suitable data such as the data described further below. The clinical process information 21a also includes information derived from the clinical processes related to a patient. This includes data such as attending nurses, attending physicians, as well as real-time status and location data for attending nurses and physicians, or any other information related to a specific patient. There may also be a desire to control the functionalities of mobile devices within the system and limiting certain device behaviors. This may be especially important in the healthcare industry where compliance with the Health Insurance Portability and Accountability Act (HIPAA) may be a legal requirement. Within the hospital and clinical facility context, the patient module can further include interface elements which provides for the control of functionalities 21b of mobile devices within the system as will be described in greater detail below. However, in other contexts, for example in manufacturing, retail or other workflow and resource management fields, the control and flexibility afforded by the system may also be useful. In a hospital and other clinical facility context, these patient modules correspond to patients incorporates the corresponding clinical process with respect to each patient or other specific projects that pertains to a hospital or a healthcare context. In alternate aspects, the process pathway may be used to refer to any other jobs or clinical pathways otherwise similar to those described below with specific reference to the hospital and clinical facility context. In one such system where it may be desirable to have a means to control process pathways may be the Workflow and Resource Management System with Integrated Bi-Directional communications as described in U.S. patent application Ser. No. 13/027,158, filed on Feb. 14, 2011, the disclosure of which is incorporated by reference herein in its entirety. The system described in the instant application may be used as a simplified platform by which each one of multiple users may use to control and present different process pathways. As such, the system may be implemented in any suitable system where it may be desirable to manage multiple users each individually using one of many devices within the system within any context, such as, for example, the healthcare or clinical facility context. In one aspect, the context may be a hospital or healthcare context, but in other aspects, may include retail or any suitable context. The system may be integrated into the system such that it leverages existing technology and devices to automate and facilitate logins, obviating expensive or undesirable specialized devices. Additionally, the system may be flexible enough to integrate with specialized pre-existing components to extend functionality. Further, the system may be integrated with the system so as to allow for fungible mobile devices. In conventional systems, a device may often be user-specific and cannot be interchangeable with another device. However, the disclosed system allows for each device to be interchangeable with another so that each device can be used by any user in place of another, while still maintaining personalization keyed to each unique user.

FIG. 1 illustrates an exemplary schematic diagram illustrating the system. Although the present invention will be described with reference to the embodiment shown in the drawings, it should be understood that the present exemplary embodiments can be used individually or in any suitable combination thereof. Although the aspects of the disclosed embodiment will be described with reference to the drawings, it should be understood that the aspects of the disclosed embodiment can be embodied in many alternate forms. In addition, any suitable size, shape or type of elements or materials could be used.

Referring to FIG. 1, a backend 11 is depicted, the backend may be the form of a general purpose computer system or server system. In alternate embodiments, the backend may also be multiple computers or servers or any other suitable device. In one aspect of the disclosed embodiment, the system backend 11 may be a cloud service provider where processing may be performed by means of a distributed computing system wherein the system backend 11 may be operating on many servers or computers concurrently or in parallel. In other aspects of the disclosed embodiment, the system backend 11 may refer to virtual hardware, for example, a virtual server running within a cloud service provider running the system backend 11. The system backend 11 may further comprise a mobile device management server 114. The mobile device management server 114 may be a module which may be configured to manage and control the functionalities of a mobile device remotely according to a predetermined system of rules or criteria. The mobile device management server 114 may be configured to limit access to certain functionalities of a mobile device that may be in communication with the system backend 11 but also provide other functionalities such as but not limited to providing different user interface features and/or enabling applications as will be described further below. The mobile device management server 114 which can also activate "log-in" functionalities, i.e. turning on a Mobile Heartbeat app, which was described in the Workflow and Resource Management System with Integrated Bi-Directional Communications as described in U.S. patent application Ser. No. 13/027,158, filed on Feb. 14, 2011, which was previously incorporated by reference in its entirety. Furthermore, backend 11 may be able to communicate over a network 12 with mobile devices that also communicate over network 12. In one embodiment, the network 12 may be a wireless network. The wireless network may be an 802.11 network, but may also be Bluetooth, Bluetooth LE, GSM, RF or any other suitable form of network. In another embodiment, the network 12 may also be a wired network. Through the network 12, the backend 11 may be able to enable a variety of data communication technology, for example, but not limited to voice-over-IP, video-over-IP, text messaging, public switched telephone networks, or any other form of bi-directional communication. This may take the form of, for example, a voice over IP telephony server 113. The backend may also run an enterprise application 111 within a server environment or a cloud environment. The enterprise application 111 may be implemented using a computer code comprising instructions that may be executed by a processor or multiple processors within the backend 11. The code may be embodied in a computer-readable medium such as a magnetic or optical disk, programmable memory chip, or any other non-transitory computer-readable medium. The enterprise application may communicate with a database 112 and access and update the information within the database. The database 112 may be a login database comprising a database containing information pertaining to user logins, personalized settings and data, and any other suitable credential information. The enterprise application 111 acts as the controller for the workplace and resource system. The login database may be used as part of an automated login system, for example, the one described in Automated Login Initialization On Detection of Identifying Information (hereinafter "Quick Launch") as described in U.S. patent application Ser. No. 13/616,483 filed on Sep. 14, 2012, the disclosure of which is incorporated by reference herein in its entirety. The enterprise application 111 on the system backend 11 is further configured to control the process pathway and presentation system. To do so, the enterprise application 111 manages and maintains a set of patient modules which are representations of real patients within the hospital or clinical facility environment.

The server environment upon which the enterprise application 111 runs may take the form of, for example, Java servlets, or any other suitable environment upon which an enterprise application may execute. Login management application 114 may also be on the backend 11 to manage users and device logins. The enterprise application 111 can also communicate with an Application Programming Interface (API) module 115. The API module 115 provides an interface for a third party user 17 to access clinical data from a generated clinical process corresponding to a particular patient with the system backend 11. The API module 115 will be discussed in greater detail below. In accordance to an embodiment, the system backend 11 may be configured for any sort of suitable reasonable use and may not be dedicated specifically for login procedures.

Referring still to FIG. 1, a number of fungible mobile devices 16 may communicate over the network 12. As described previously, the network 12 may be a wireless network in some embodiments. The wireless network may be an 802.11 network, but may also be Bluetooth, WiMax, Bluetooth LE, RF, GSM or any other suitable form of network. In other embodiments, the network 12 may also be a wired network. In one aspect of the disclosed embodiments, the mobile devices 16 may be generally fungible devices as previously noted, that is, one mobile device 16 may be interchangeable with any other mobile device 16. Thus, mobile device 16 may store no personalized settings or data desirable for operation, instead relying on data received from the system backend 11 by means of a device data application 161. However, in other aspects of the disclosed embodiment, the mobile device 16 may be unique to the user, but configured so that functionalities available within the system are locked or blocked when no longer logged in. As may be seen in FIG. 1C, an exemplary schematic diagram of a mobile device 16 is shown. The mobile device 16 may have a mobile device processor 161. The mobile device processor may be a CPU or System on a Chip (SOC), but in alternate aspects, may be any suitable processor. The mobile processor 161 may be used to execute a data application 166. The data application 166 may communicate with backend 11 through the data module 116, for example via Web Services such as SOAP protocols, or any other suitable communications protocols and may be capable of accessing and updating data stored within the database 112, possibly through the mobile device management server 114. The device data application 162 may take the form of a native application designed to run as computer code executed by mobile device 16. The computer code may be embodied in a computer-readable medium stored on mobile device 16 such as magnetic or optical disk, programmable computer chip or any other non-transitory computer-readable medium. In other embodiments, the device data application 166 may also take the form of a non-native application, for example, a Java-based application running on a virtual machine or a web-based application such as an HTML5 application. In some aspects of the disclosed embodiment, the mobile devices may take the form of smartphones. The mobile device processor 161 is also connected to a display 165, which may be a touchscreen display. In other aspects, the display 165 may be any suitable display. In other aspects of the disclosed embodiment, the mobile devices 16 may also be in the form of Personal Digital Assistants (PDAs), computer terminals, or any other suitable device capable of running the device data application 166 described above. Other devices may also be able to communicate with backend 11 through the network 12 as described above. Such devices may include sensors 15 or any other suitable devices. In yet other aspects of the disclosed embodiment, the mobile devices 16 may have a touchscreen, but in alternate aspects, any suitable interface may be used.

The mobile device 16 may also have multiple operative modes 16A, 16B with associated user interface modes 163, 164. For example, one operative mode 16A and respective user interface mode 164 may allow a user to have largely unrestricted access to the mobile device 16, the mobile device's applications and data stored therein, and the mobile device 16's functionalities that are natively available, for example, use of and access to cameras, web browsers, telephony capabilities, etc. In some aspects, the functionalities may include the running of any arbitrary applications or any other suitable mobile device functionality. These may be referred to, collectively, as a mobile device's built-in functionalities which a device may run when a mobile device 16 is placed in an unrestricted user interface mode 164. In alternate aspects, other user interface modes may be included, including, for instance, more than one restricted user interface modes. In one aspect of the disclosed embodiment, there may be another device operating mode with the respective one or more user interface modes 163 which is/are restricted in functionality or access. The terms "restricted" or "restrictive" are used herein for convenience to describe different exemplary states between the different modes 16A, 16B (e.g. unrestricted versus restricted) of the mobile device 16. For example, in the restricted mode 16B of the mobile device 16, devices or user interface access is restricted (i.e. delimited in some form, such as different login criteria compared to unrestricted, etc.) and one or more functionalities (for example, built-in functions or applications) or operations of the device may be disabled, disconnected, disallowed use, disaffect operation, turned off, not accessible, not usable or otherwise unavailable and such functionality or operation of the device may be available when in the unrestricted mode as will be described in greater detail further below. By way of example, disabling functionality may refer to disallowing use of a mobile device component—for example, a camera or speakers or telephony capabilities. However, in other aspects, may refer to disabling use of certain softwares or applications or disabling the ability for certain software functionalities to be run—for example, disabling the display of photos, or disabling the ability to run a software module, for instance, a billing functionality or any other suitable functionality. The restricted user interface mode 16B may have one or more functionalities (i.e. the built-in functions) disabled and unavailable, at least through the same or common access or interface modes compared to the unrestricted interface mode 16A. In other aspects of the disclosed embodiment, the restricted mode 16B of the mobile device 16 may mean that the unrestricted access to mobile device 16 functionalities is disabled. That is, where the unrestricted mode 16A may allow for unrestricted access to mobile device functionalities, a restricted mode 16B will disable this unrestricted access and place certain limitations on the access of mobile device functionalities. However, as noted before, the mobile device 16, when in the restricted mode 16B, may have other functionalities (e.g. user interface 163 and one or more function modules, described further below) not available or accessible in the unrestricted mode. In some aspects of the disclosed embodiment, a transition from an unrestricted mode 16A to a restricted mode 16B may mean that certain mobile device functionalities may be disabled for some users, but may remain accessible to others despite being in a restricted mode 16B. For instance, certain users may have permissions or may have access to some of the mobile device 16 functionalities. Others, however, may have different permissions and may have access to other mobile device 16 functionalities such that when they enter the restricted mode 16B, they may have different functionalities still available to them by the reason of their respective permissions or access. In some aspects of the disclosed embodiment, the system backend 11 may be able to divide users into different functional groups whereby the users of each functional group may have access to different functionalities of the mobile device 16 according to a user or administrator generated rule or functionality. Functional groups may be further described further below. Generally, however, the operation of the built-in functions may be disabled when operating in the restricted user interface mode 16B.

It may be noted that in some aspects of the disclosed embodiment, the unrestricted mode 16A and the restricted mode 16B may not be operable or available at the same time. However, there may be more than one restricted modes 16B with different levels of restriction which may co-exist at the same time.

The one or more restricted user interface modes 16B may be managed by the mobile device management server 114 which the mobile device 16 may be communicating with via the network 12. The mobile device management server 114 may be able to set or define restricted mobile device 15 use policies of one or more restricted user interface modes according to a predetermined set of rules as can be described further below. For example, rules may exist on the mobile device management server 114 to limit certain applications or functionalities from being launched. For example, this may include, but is not limited to the camera, browser, settings, etc. Rules may also exist on the mobile device management server 114 to limit certain functionalities of the mobile device 16. For example, these functionalities may include but are not limited to screenshots, certain system settings, running applications or any other suitable mobile device functionality. These functionalities or applications may be the built-in functions described above. Disabled functions and applications may, in one aspect of the disclosed embodiment, may appear in phantom on the phone user interface when a restricted user interface mode may be active. In alternate aspects of the disclosed embodiment, the restricted user interface may simply not show the disabled functions and applications. In yet other alternate aspects, the restricted user interface may have a special user interface specific only to the restricted user interface mode. In yet alternate aspects of the disclosed embodiment, the restricted user interface mode may have an entirely different user interface. The transition between an unrestricted user interface mode to a restricted user interface mode may be activated by a login action. In one aspects of the disclosed embodiment, the login action may be a simple login action by entering one's user credentials into the data application 161. In alternate aspects of the disclosed embodiment, the login action may be done through an automated login action, such as, for example, a "Quick Launch" login. In yet alternate aspects, a login action may be done through any suitable means. Conversely, a transition away from a restricted user interface mode may be done by a corresponding log out action. In yet another aspect of the disclosed embodiment, a login action may transition an unrestricted user interface mode to an intermediate mode between a restricted user interface mode and an unrestricted user interface mode. For instance, a login action may transition an unrestricted user interface mode into an intermediate mode. The intermediate mode may still be substantially unrestricted, however the user may be logged into the system backend through the login action. A further login action may effect a transition into a restricted mode. The further login action may be, for instance, entering a pin number or any other suitable action to complete the transition between an unrestricted user interface mode and a restricted user interface mode.

Referring now to FIG. 1A, a block diagram of the functions of the mobile device 16 may be shown. In FIG. 1A, the accessibility of mobile device functionalities 162 may be directly available to a mobile device 16 through an unrestricted user interface mode 164 when no log-in action is made. As can be seen, the restricted user interface 163 is shown in phantom to represent that a restricted user interface mode 163 has not been initialized. In FIG. 1B, a block diagram of the functions of the mobile device 16 may be shown after the initialization of a restricted user interface mode 163. In FIG. 1B, the mobile device functions 162' may be accessible through the restricted user interface mode 163 after a log-in action is made. The unrestricted user interface mode 164 may be no longer accessible after the log-in action. The mobile device 16 may access the mobile device functionalities 162' through the restricted user interface mode 163 through the selection of a listed patient element from a list of patients representing a patient module corresponding to a clinical process. As may be noted, in alternate aspects, there may be an intermediate mode 165 (shown in phantom) wherein a login action may have occurred, but the access is still substantially in an unrestricted user interface mode. The intermediate mode 165 may be effected by an additional step before a user can transition into a restricted user interface 163. Each of the mobile device functions 162' accessible through a specific selected process pathway may also share a predetermined characteristic with their respective selected process pathway. Similarly, each process pathways of the set of process pathways may have a different predetermined characteristic which may be shared with the mobile device functions 162' which are accessible through the selection of each process pathway. When in a restricted user interface mode 163, the selection of a mobile device function 162' may be dependent on the selection of at least one process pathway. Conversely, the functionality selected may also serve to directly perform or effect a change on a physical task of a process pathway with the mobile device. For instance, this may include billing functionalities with respect to a process pathway, photographic functionalities of for a process pathway, ordering lab results for a process pathway or any other suitable actions which may affect a physical task of a process pathway.

Figure 2:
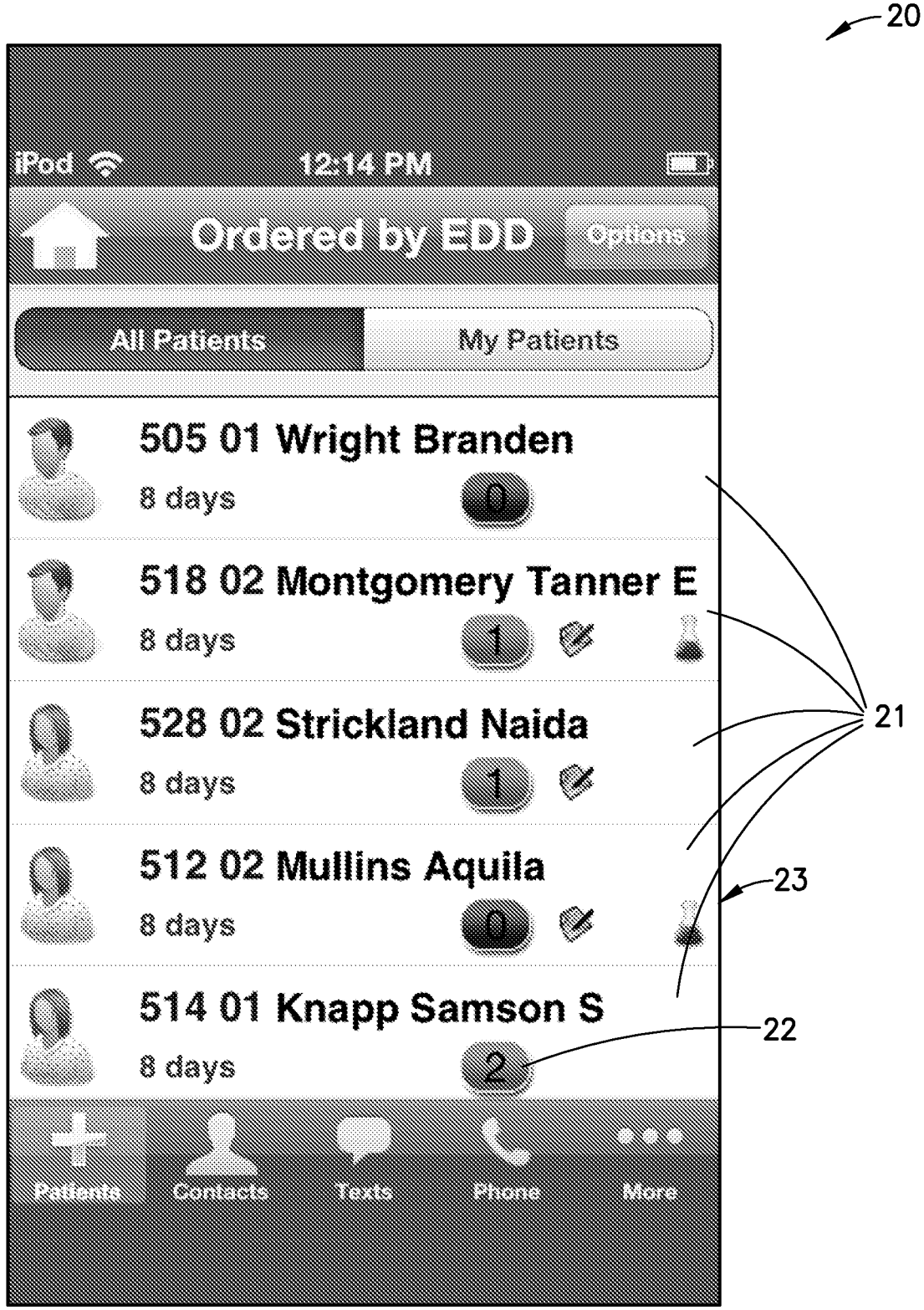
FIG. 2 is a representation of a user interface displaying a listing of process pathways on a mobile device.

Referring now to FIG. 2, a patient list user interface display 20 of a mobile device 16 within the data application 161 is shown. The patient list user interface display 20 may be shown after a login action has occurred with the mobile device 16. For example, the login action may be a standard credential login action. In alternate aspects, it may be an automated login action, for example a Quick Launch login. The patient list user interface display 20 is displayed within a restricted user interface mode and is not be available in an unrestricted user interface mode. Mobile device 16 may receive a listing of jobs or process pathways from the system backend 11 only when the mobile device 15 has completed the login action, and thus may be in a restricted user interface mode 163. The mobile processor of the mobile device 16 may further be configured to present a list of listed patient elements 21, each listed patient element 21 representing a patient module which is, in turn, a representation of a real-world patient which defines and encompasses a clinical process/process pathway for that patient. Each listed patient element 21 shown in patient list user interface 20, when selected, provides the mobile device 16 with access to the set of clinical process information associated with the corresponding clinical process for a patient and the corresponding clinical process. For example, in one aspect of the disclosed embodiment, each of the listing of patients 21 provides a mobile device 16 with access to clinical process information related to billing, diagnostic, pharmacy and clinical process task data or any other sort of suitable data related to a listed patient element 21. However, in other aspects of the disclosed embodiment, the listed patient element 21 also provides access to other clinical process information such as information pertaining to care team workers, including, for example, real time status or location information of doctors, nurses or other care team workers or any other suitable data related to the care of a patient. The real time status or location information can be derived from, for example, the one described in SYSTEM FOR DYNAMIC LOCATION-AWARE PATIENT CARE PROCESS CONTROLS AND DYNAMIC LOCATION-AWARE ASSET TRACKING (hereinafter "Location-Aware Patient Care Process Controls") as described in U.S. Provisional Patent Application 62/032,172 filed on Aug. 1, 2014, the disclosure of which is incorporated by reference herein in its entirety. Each listed patient element 21, when selected, also provides the mobile device 16 with interface elements corresponding to a set of mobile device functionalities related to the clinical process information associated with listed patient element 21, which will be discussed in further detail below. The list of patients 21 as shown in FIG. 2 is shown in in a healthcare or other clinical facility context.

Each listed patient element 21 shown on the patient listing user interface 20 and represents a patient module and is shown with additional indicia. For example, listed patient element 21 may include an indicator 22 of outstanding actions that may be taken. In alternate aspects, the indicator 22 could be used to indicate any suitable information at a glance such as, but not limited to, outstanding alerts. Each listed patient element 21 may also have indicia 23. These indicia 23 may be used, for example, to indicate some information about the listed patient element 21. For example, the indicia 23 may disclose lab results or notes or any other suitable indicator. Each listed patient element 21 may be selectable by a user, for example, by means of a touchscreen on a mobile device 16. However, in alternate aspects, the mobile device 16 may have any suitable interface (for example, mouse and keyboard, or trackball or keyboard, etc.) that allows for the selection of one element of the list of listed patient elements 21.

Referring now to FIG. 1C, a simplified block diagram of the system backend 11 (shown in phantom) and its relationship to the API 115 and the third party user 17 is shown. The system backend 11 includes the enterprise application 111 and the API 115, which are in communication with each other, as modules contained within the system backend 11. In one aspect of the disclosed embodiment, the enterprise application 111 tracks one or more listed patient elements 21, each of which represents and defines a patient module. As noted above, the patient module represented by the listed patient element 21 encompasses clinical process information 21a associated with a corresponding patient. In one aspect of the disclosed embodiment, the clinical process information 21a includes, for instance the status of a patient, the diagnosis of a patient, the list of attending physicians, the list of attending nurses, medications prescribed, or clinical process tasks generated for the patient in question. However, in other aspects, the clinical process information 21a includes any suitable patient-oriented data, including, for example, real time status of patient care team members and real time locations, as derived from the Location-Aware Patient Care Process Controls system discussed previously. The listed patient element 21 representing a patient module stored within the enterprise application 111 further encompasses functions 21b. The functions 21b pertain to functions configured to manipulate at least a portion of the set of clinical process information 21a by controlling a functionality of the mobile device 16. In one aspect, the functions 21b are mobile device 16 functions managed by the mobile device management server 114 and will be discussed in greater detail below. In other aspects, the functions 21b also include other suitable functions, including functions for formatting and control of the clinical process information 21a. The mobile device 16 can communicate with the system backend 11 and the enterprise application 111 to receive the listed patient elements 21 and the associated patient modules. The mobile device 16 can present the listed patient elements 21 and also the set of functions 21b associated with each associated patient module. The mobile device 16 can also effect action on the clinical process information 21a associated with a listed patient element 21 by activating one of the functions 21b associated with the respective listed patient element 21.

Referring still to FIG. 1C, a third party user 17 can also communicate with the system backend 11 and the enterprise application 111 via the API 115. In one aspect of the disclosed embodiment, third party users 17 include third party application makers which request access to at least a portion of the clinical process information 21a related to a predetermined listed patient element 21. The access third party user 17 has with the API 115 will allow the third party user 17 access to clinical process information 21a generate a user interface similar to that shown in FIG. 2 for a predetermined listed patient element 21. In one aspect of the disclosed embodiment, third party users 17 may include, for instance, web developers making health-care tracking portals, widget makers which display information related to patients or any other suitable application. Third party users 17 can also include suitable hardware manufacturers, for instance, those that create devices for tracking a listed patient element 21. For instance, this may include bedside displays or smart watches or wearable devices or any other suitable devices which may access a patient's clinical process information 21*a*. In one aspect of the disclosed embodiment, the API 115 functions as an intermediary interface between the third party user 17 and the enterprise application 1111. The third party user 17 can access clinical process information 21*a* of the listed patient element 21 generated by the enterprise application 111 by making calls to the API 115. It is noted that any changes to the clinical process information 21*a* associated with the listed patient element 21, whether caused by a mobile device 16 or by the system backend 11 will immediately and dynamically available on all devices which can access the clinical process information 21*a* associated with the listed patient element 21. This is true both for mobile devices 16 and of third party users 17.

Referring now to FIG. 1D, an exemplary flow chart illustrating the operation of the system backend with respect to the API 115 is shown. At block 181, the system backend 11 generates a list of listed patient elements 21, each of the listed patient elements 21 corresponding to a clinical process and defining a patient module as described above. At block 182, the system backend provides each listed patient element 21 with corresponding clinical process information 21*a*. At block 183, the system backend 11 provides an API 115 to enable a third party user 17 to communicate with the system backend 11. In one aspect, the third party user 17 communicates with the system backend 11 via the network 12, but in other aspects, could be any suitable connection such as, for example, a direct connection to the system backend. At block 185, the system backend 11 provides a portion of the set of clinical process information from a patient module associated with a predetermined listed patient element 21 to the third party user 17 via the API 115.

Figure 3A:
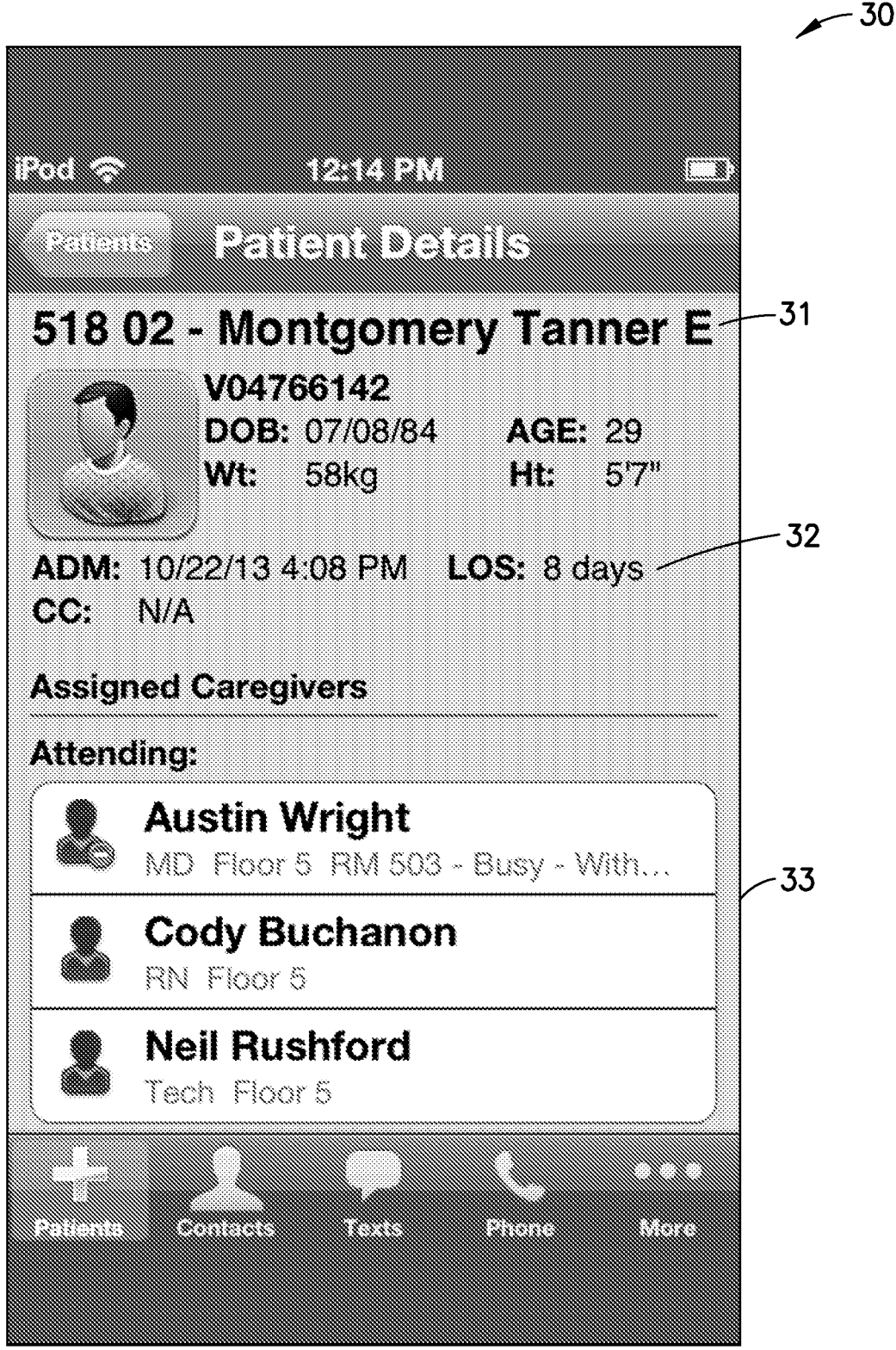
FIG. 3*a* is a representation of a user interface displaying a detail view of a process pathway on a mobile device.

Referring now to FIG. 3A, a general view of a user interface 30 for a selected listed patient element 21 is shown. As was shown in FIG. 2, the listed patient element 21 represents a patient module. The user interface 30 as shown in FIG. 3A is the user interface that may be presented to a user when a listed patient element 21 may be selected by a user. The general view of the user interface 30 may be shown in the form of a touchscreen display, but in alternate aspects, the user interface may be usable by a mobile device 16 having a keyboard or a cursor or any other suitable means of interacting with a mobile device 16. The general view of a user interface 30 may have a section 31 which displays clinical process information 21*b* for a selected listed patient element 21. The clinical process information 21*b* may include the name of a particular listed patient element 21 or a job. This section 31 may also include any other suitable information related to the job or listed patient element 21 (not shown). In mobile device functionalities section 310, there may be one or more mobile device functionality interface elements shown within the mobile device functionalities section 310. In one aspect of the disclosed embodiment, the mobile device functionalities section 310 correspond to the functionalities 21*b* of the listed patient element 21 as shown in FIG. 1C. As can be seen in FIG. 3A, mobile device functionalities 1-3 are shown, each related to a different mobile device functionality which may be accessible through the user interface 30 for the selected listed patient element 21. In FIG. 3A, only three mobile device functionalities 1-3 are shown, however, in alternate aspects, any number of mobile device functionalities may be accessible through the user interface 30 for a patient/clinical process related to a listed patient element 21. The user interface shown in FIG. 3A is exemplary only and is not limited to the sections and elements shown within FIG. 3A. In alternate aspects, there may be more or fewer sections as the situation related to a particular listed patient element 21 may permit.

Figure 3B:
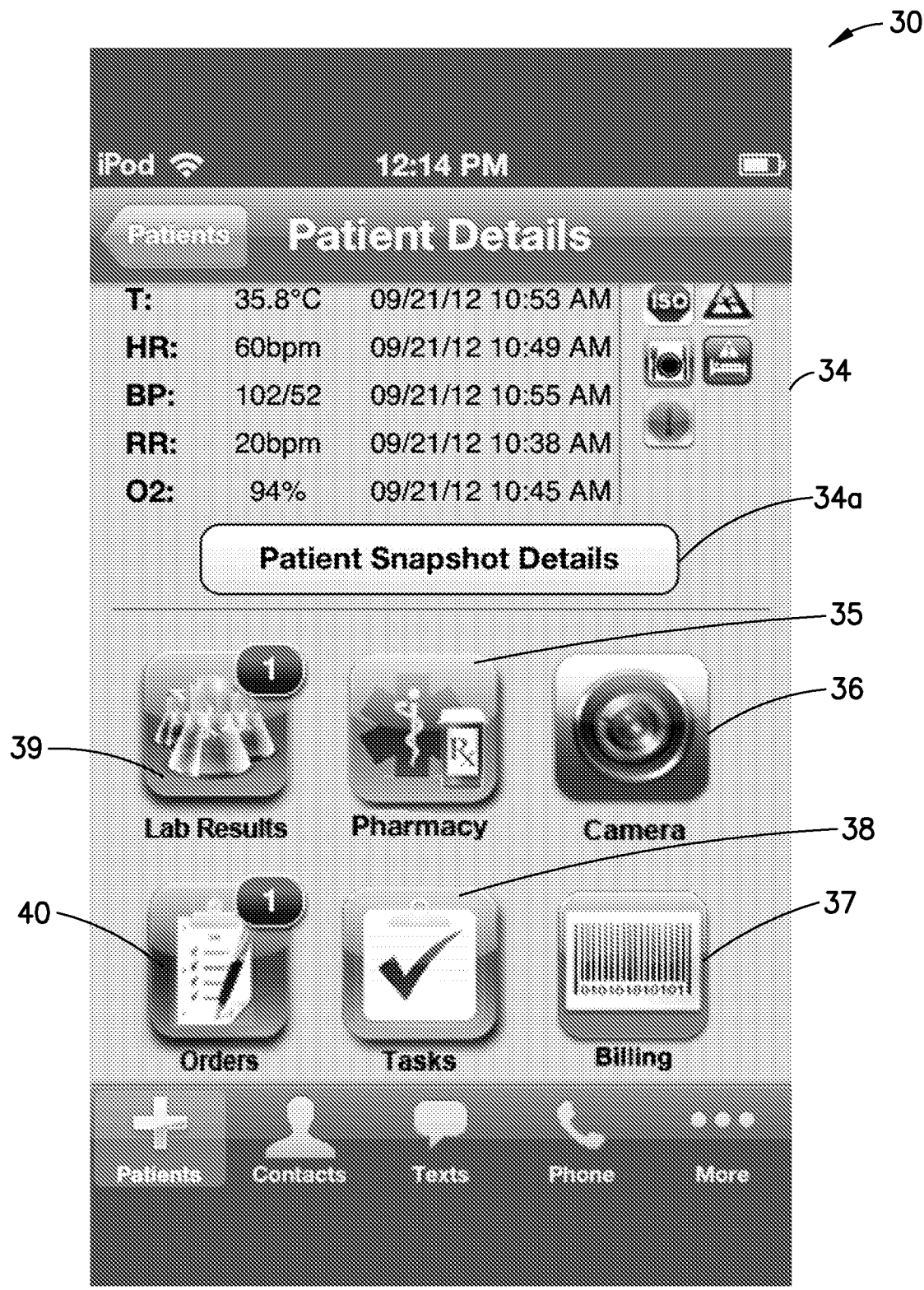
FIG. 3*b* is a representation of a user interface displaying a detail view of a process pathway showing a set of user interface functionalities.

Referring still to FIG. 3A, a specific example of a detailed user interface 30 of one of a selected listed patient element 21 is shown. As can be seen in FIGS. 3A and 3B, the example of a detailed user interface 30 shown may have more information than in a general user interface of a showing a selected listed patient element 21. This detailed user interface 30 may be the view that may be shown when a user selects one of the listed patient elements 21 in the user interface shown in FIG. 2. The detailed user interface 30 of one of the listed patient element 21 may include an indication of the listed patient element 21's designation 31. In the example shown in FIG. 3A, in a hospital context, the listed patient element 21 has a designation 31' may be in the form of a patient name. However, in any other context, any other suitable designation may be used—for example, a project name. The detail user interface 30 may also include other additional information 32 related to the selected listed patient element 21. For example, in the context of a hospital and healthcare setting, additional information 32 may be in the form of health related statistical data. In the example shown on FIG. 3A, the health related data may include, for example, a unique identifier (for example, V04766142), date of birth, age, height, weight, date of admission, length of stay, etc. In alternate aspects, any suitable information related to the selected listed patient element 21 may be presented. In yet other aspects, no additional information may be presented at all. Detail user interface 30 of the selected listed patient elements 21 may further include other information. For example in detail user interface 30, additional indicators such as an assigned caregiver list 33 may be shown. In a hospital context, this may be a listing of all caretakers and doctors who are specifically assigned to work on a specific project or a specific listed patient element 21, in this case, a particular patient. In alternate contexts, this may be a listing of individuals assigned to a particular project or any other suitable indicators of individuals working on a particular project or listed patient. In yet other aspects, no information related to who is assigned to a particular process pathway or project may be presented. The additional information 32 and assigned caregiver list 33 shown on detailed user interface 30 are derived from the clinical process information 21*a* associated with the listed patient element 21.

Referring now to FIG. 3B, the detailed view 30 is continued. Detail user interface 30 may have additional information displayed. For example, a patient snapshot section 34 may be displayed which may have additional information about a patient in a hospital context. For example, the patient snapshot section 34 may have data about heart rates, blood pressure, resting rates of the pulse, O2 meter and body temperature. The patient snapshot section 34 have additional information available through a section selectable for detailed patient snapshot information 34*a*. In a hospital and healthcare context, the information that is displayed in patient snapshot 34 and the information displayed when patient snapshot details 34*a* may be selected are data that pertains to the process pathway or project, for example, a specific patient. The data displayed in the patient snapshot 34 and patient snapshot details 34*a* may be received from the system backend 11 and may be specifically channelized to a particular listed patient element 21. The information presented may be specifically limited to the particular listed patient element 21 that may be associated with each patient snapshot 34 and patient snapshot details 34a and may not be available for any other listed patient elements 21. In alternate aspects, any suitable data may be displayed in the equivalent of patient snapshot section 34' and patient snapshot 34a. This may include detail data for projects or process workflows in other contexts. In yet alternate aspects, no detailed data may be shown. Again, all of the information presented in FIG. 3B are derived from the clinical process information 21a associated with a listed patient element 21.

Referring still to FIG. 3B, the detail user interface 30 may further present a selection of interface elements 35-40 on the display from within a selected listed patient element 21, each interface element representing a number of mobile device functionalities/built-in functions. In one aspect of the disclosed embodiment, the selection of each interface element is dependent on the selection of a listed patient element. Each mobile device functionality may be activated by the selection of an interface element when a particular listed patient element 21 is selected. The mobile device functionalities are specific functionalities of a mobile device accessible through selecting of one of the interface elements 35-40 when a listed patient element 21 of the list of listed patient element 21 is selected and when the device is in a restricted user interface mode 163. The mobile device functionalities may be the built-in functions as described above and which are re-enabled through the list of listed patient elements 21 in the restricted user interface mode 163. Each mobile device functionality may be specifically channelized for the specific listed patient elements 21 or project that is currently selected. Thus, each mobile device functionality may be associated with a respective listed patient elements 21 from which it is accessible. Each mobile device functionality may, in one aspect of the disclosed embodiment, have a different predetermined characteristic(s) for each respective listed patient element 21. In one aspect of the disclosed embodiment, a mobile device functionality associated with a selected listed patient element 21 may share a predetermined characteristic with the listed patient element 21 associated with the mobile device functionality because both the mobile device functionality and process pathway relate to the same clinical process associated with the listed patient element 21. For example, where a listed patient element 21 is named "John Doe," the respective Lab Results mobile device functionality may also share a predetermined characteristic with the clinical process—specifically, both the Lab Results mobile device functionality and the clinical process associated with the patient "John Doe." In another example, a Pharmacy mobile device functionality associated with the patient "John Doe" may also include pharmacy data related to "John Doe." Similarly with the Camera mobile device functionality for the patient "John Doe," where the Camera mobile device functionality may allow one to take pictures or view pictures related to the patient "John Doe." For an Orders mobile device functionality associated with a patient for "John Doe," the Orders viewable and controllable may relate to the patient "John Doe." The Tasks mobile device functionality associated with the patient "John Doe" may also present tasks related to "John Doe." And similarly, with a Billing mobile device function, the Billing controls presented may relate to the patient "John Doe." In alternate aspects, each of the listed patient elements 21 may have a different predetermined characteristic which is shared with the mobile device functionalities associated with the respective listed patient element 21. Because the mobile device 16 may be in a restricted user interface mode when a specific listed patient element 21 is selected, certain functionalities of the mobile device 16 may be deactivated or inactive or unavailable typically when a listed patient element 21 is not selected. However, each mobile device functionality represented by interface elements 35-40 may be available for access by a user when a listed patient element 21 is selected. Thus, the listed patient element 21 channelizes the specific interface elements 35-40 representing a mobile device functionality so that the way to access the mobile device functionalities is by selecting a listed patient element 21. Further, each of the mobile device functionalities represented by interface elements 35-40 within a specific listed patient element 21 or project may be specifically restricted by the system backend 11 to data and functionality that directly pertains to the listed patient element 21. For example, the mobile device functionalities may have a different predetermined attribute for each different listed patient element 21. For this reason, when the functionality related to the listed patient element 21 effects an action on the clinical process information 21a related to the listed patient element 21 and the corresponding patient module (as seen here and in examples below), the resulting action will be in compliance with HIPAA rules for confidentiality. In alternate embodiments, each different listed patient element 21 may have a different predetermined attribute which is shared with the mobile device functionality. It is noted that when a mobile device is in an unrestricted user interface mode 164, the mobile device may be configured to present one or more of the interface elements representing mobile device functionalities and built-in functions outside of the selection of a listed patient element 21. Thus, in when a mobile device is in an unrestricted user interface mode 164, the interface elements representing mobile device functionalities and built-in functions are available generally and may not be specifically accessible through the list of listed patient elements 21.

It should be noted that in one aspect of the disclosed embodiment, when a listed patient element 21 is selected, the set of interface elements 35-40 may be the same for each listed patient element 21 of the list of listed patient elements 21. However, in alternate aspects of the disclosed embodiments, each listed patient element 21 may have a different set of interface elements 35-40 representing different sets of mobile device functionalities. For example, in a healthcare context, a listed patient element 21 representing a patient experiencing a heart attack may have a different set of interface elements than a listed patient element 21 representing a cancer patient. A listed patient element 21 associated with a cancer patient may have a set of interface elements corresponding to mobile device functionalities related to the oncology department. A clinical process associated with a cardiac patient may have a set of interface elements correspond to mobile device functionalities related to the cardiac department. In one aspect of the disclosed embodiment, each listed patient element 21 may have different sets of interface elements representing different sets of mobile device functionalities. In another aspect, each listed patient elements 21 may have the same sets of interface elements representing different sets of mobile device functionalities. In yet another aspect of the disclosed embodiment, a listed patient elements 21 may have different sets of interface elements representing different sets of mobile device functionalities depending on the user that is currently logged in on mobile device 16. For example, a head nurse assigned to a particular patient may see a different set of interface elements than a different user (for example, an EMT) assigned to the same patient. In yet other aspects, any suitable means of displaying the sets of interface elements representing different sets of mobile device functionalities may be used.

Figure 4:
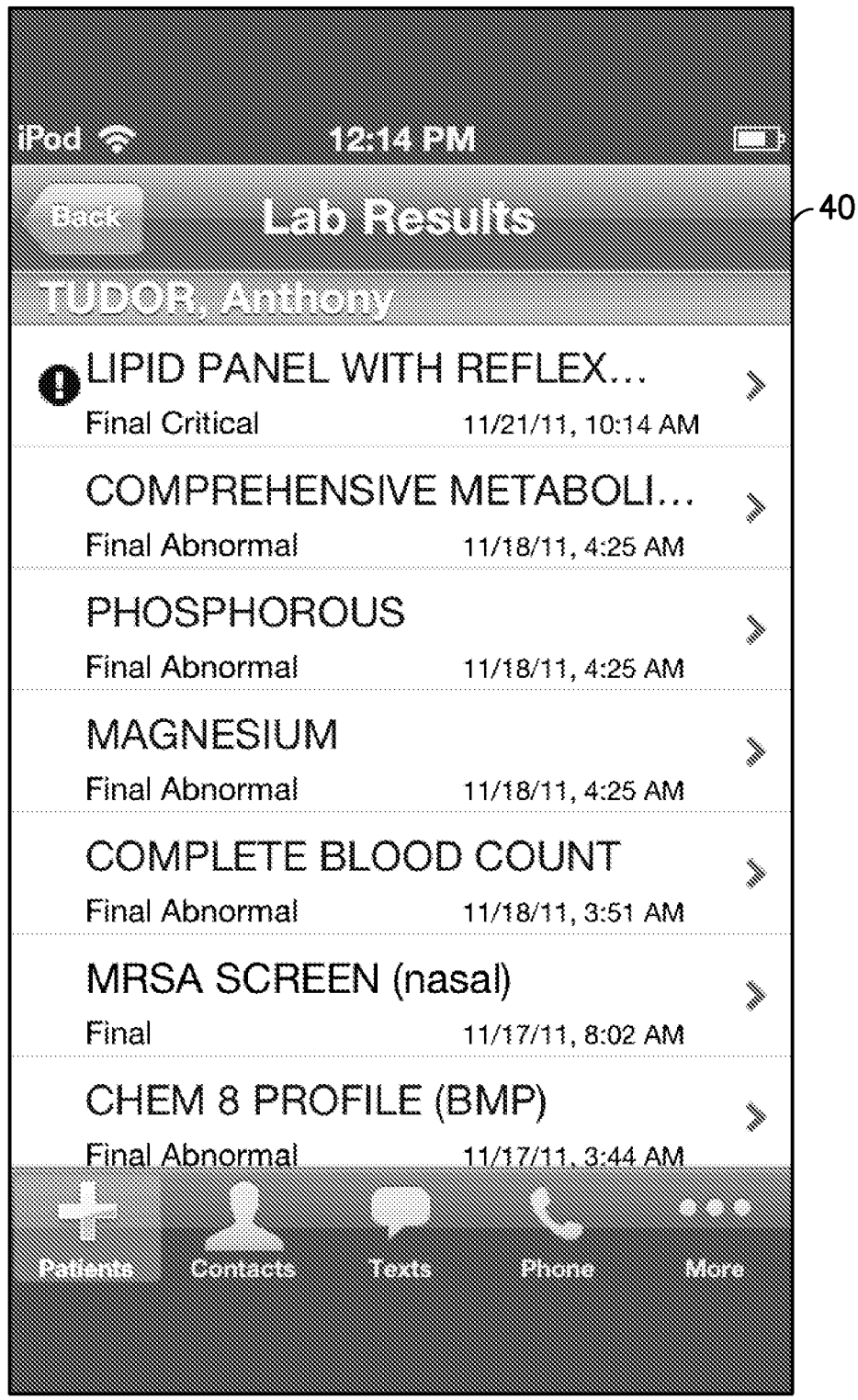
FIG. 4 is an exemplary user interface for a Lab results user interface functionality.

Returning again to FIG. 3B, a number of exemplary interface elements 35-40 representing different sets of mobile device functionalities are shown. One exemplary interface elements may be the Lab Results interface element 39. The lab results interface element 39 may represent a mobile device functionality/built-in function for listed patient element 21. Lab results interface element 39 may be selectable by a user to enabling control over a detailed listing of reports and results from laboratory work done on a particular listed patient element 21. The detailed listing of reports and results 40 may be seen in FIG. 4. The information presented in the detail listing of reports and results 40 shown in FIG. 4 may contain only the information pertaining to the specific listed patient element 21 selected by the user. In one aspect of the disclosed embodiment, the detail listing of reports and results 40 may disclose only the laboratory results ordered associated with a specific patient. No laboratory results from any other patients may be shown in the listing of reports and results 40. Turning again to the example of the Lab Results interface element 49 and FIG. 4, in one aspect of the disclosed embodiment, the detail listing of reports and results 40 may allow a user to order additional laboratory work for the specific listed patient element 21. However, in alternate aspects, the detail listing of reports and results 40 may not allow additional ordering of additional laboratory work for the specific listed patient element 21. In other alternate aspects, the additional laboratory work that may be ordered through a detail listing of reports and results 40 may be limited specifically for the particular listed patient element 21 according to predetermined rules associated with a particular clinical process generated for the listed patient element 21 by the system backend 11. For example, the clinical process for a patient in the healthcare context afflicted with a particular ailment (for example, an MRSA infection) may present an option in the detail listing of reports and results 40 to order additional laboratory work. The additional laboratory work which may be ordered may be selected from a listing of possible laboratory work tailored for the specific ailment of patient of listed patient element 21. For example, in the example of MRSA, the laboratory work that may be ordered may include blood culture testing or laboratory work related to infectious diseases. However, the laboratory work may not make non-relevant laboratory work such as X-Rays or radiology available to be ordered through the detail listing of reports and results 40 because they are not relevant to the specific ailment of a particular patient. It should be noted that different users may have different functionalities with regards to the laboratory results functionality. For instance, different users may see different aspects of the laboratory results. In other aspects, different users may have different permissions to, for instance, respond or escalate a laboratory result to a higher level of priority or to alert a higher level of managers to a laboratory result depending on the permissions and context of a situation.

Figure 5:
FIG. 5 is an exemplary user interface for a pharmacy user interface functionality.

Similarly, for the Pharmacy interface element 35, this interface element may represent a pharmacy mobile device functionality/built-in function for listed patient element 21. Pharmacy interface element 35 may be selectable by a user to enable control of a pharmacy detail listing 51 (see FIG. 5) with respect to a selected listed patient element 21. As with the Lab Results interface element 39, the pharmacy detail listing 51 may be specifically tailored for the specific patient associated with a selected listed patient element 21 in a hospital context. The information listed in the pharmacy detail listing 51 may be the specific pharmacy orders for a particular listed patient elements 21 (i.e. a patient) and only that particular listed patient element 21. The results are discriminated and channelized for a particular patient associated with a specific listed patient elements 21. For example, a specific patient, for example, with a case of influenza may have a pharmacy interface element 35 which may be selected by a user to display a pharmacy detail listing 41 with respect to the corresponding listed patient element 21. The pharmacy detail listing 51 may include a listing of the medication or drugs prescribed to the listed patient 21 with influenza—for example, antiviral medication or IV fluids. The pharmacy detail listing 51 may display only the data associated with the specific listed patient 21 and not any other listed patient 21. In one aspect of the disclosed embodiment, the pharmacy detail listing 51 may only list only the medications and prescriptions associated with a listed patient element 21. In alternate aspects, the pharmacy detail listing 51 may also allow a user to order or prescribe additional medication or prescriptions. For example, a user may prescribe a patient associated with a specific listed patient element 21 some anti-inflammatory medication in addition to antiviral medication. In alternate aspects of the disclosed embodiment, the pharmacy detail listing 51 may allow a user to order or prescribe additional medication or prescription according to a predetermined rule related to the listed patient elements 21. For example, in the case of a patient with influenza, the prescriptions and medications that may be ordered through the pharmacy detail listing 51 may be tailored for a patient being treated for influenza. In alternate aspects, any suitable means of operating the pharmacy detail listing 51 may be possible.

Figure 6:
FIG. 6 is an exemplary user interface for a camera user interface functionality.
Figure 6A:
FIG. 6A is another exemplary user interface for a camera user interface functionality.
Figure 6B:
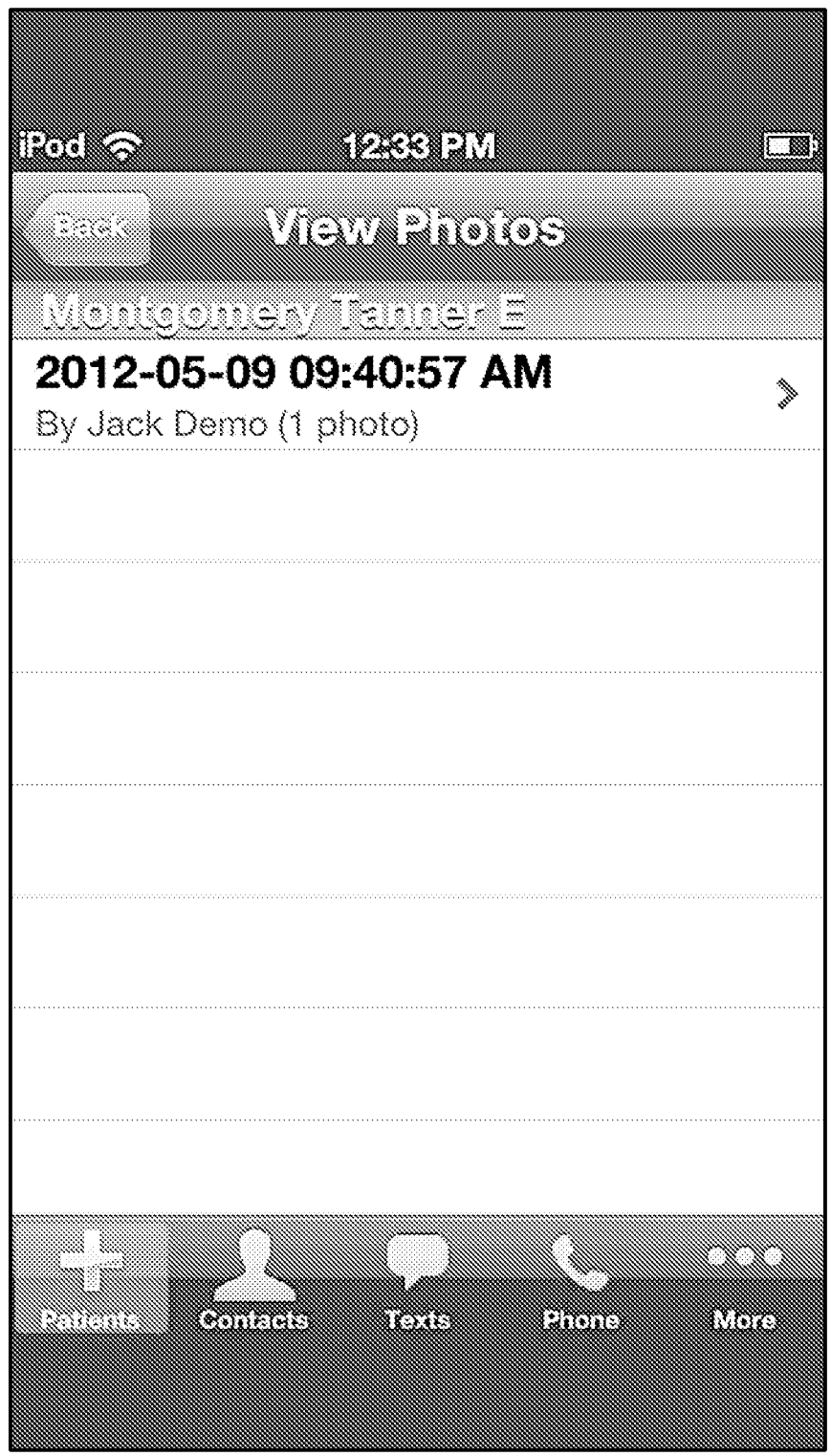
FIG. 6B is an exemplary user interface for a camera photo viewer user interface functionality.
Figure 6C:
FIG. 6C is an exemplary user interface for a camera photo viewer user interface functionality.

Similarly with respect to the camera interface element 36 shown on detail view 30, the camera interface element 36 represents a camera mobile device functionality/built-in function. In one aspect of the disclosed embodiment, selecting the camera interface element 36 may result in the enablement of control of a menu allowing for a user to select either a camera function 61 or a picture viewer function 62 (see FIG. 6). Selecting a camera function 61 may allow a user to, in a hospital or clinical facility context, take a picture associated with a particular listed patient element 21. For example, a user may take a picture of an injury of a patient (see FIG. 6A). The image resulting from using a camera function may be stored on the system backend 11 specifically and restricted to the corresponding listed patient element 21. Selecting a picture viewer function 62 may allow a user to view photographs specifically associated with a particular listed patient 21. Referring now to FIGS. 6B-C, a user may select from the photos which are specifically associated with the listed patient element 21/patient and view the photos. Photos and pictures associated with other patients 21 will not be available. The camera interface element 36 may present the ability for a user to record data related to a particular listed patient element 21 used for diagnostic reasons in a hospital context directly through a mobile device 16. For instance, the user may directly upload via the mobile device 16 diagnostic data used by a doctors through the mobile device 16, which may alter some aspect of the clinical process information 21a associated with the listed patient element 21.

Figure 7:
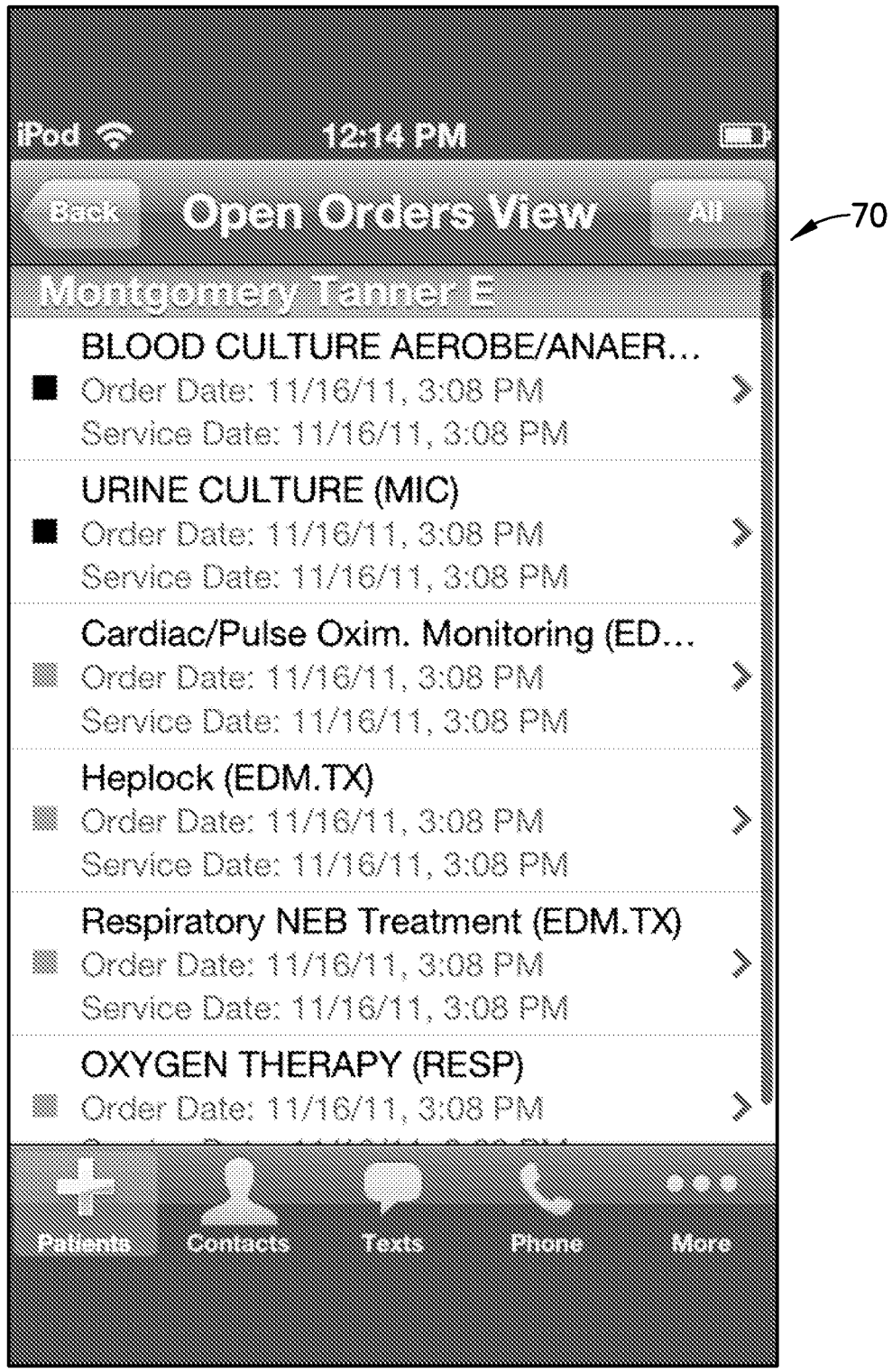
FIG. 7 is an exemplary user interface for an open orders user interface functionality.

With respect to orders interface element 40, the orders interface element 40 may be selectable by a user to enable control over an orders detail view 70 (see FIG. 7). An order detail view 70 may display all of the orders made by an attending physician for a particular listed patient element 21 associated with a patient. This may include orders for blood cultures, urine cultures, Cardiac and Pulse monitoring among others. The detail view 70 may also include allow a user to enter additional orders (not shown). In one aspect of the disclosed embodiment, a user, for example an attending physician, may enter additional orders for a particular process pathway or patient. The orders displayed in order detail view 70 may be restricted to that which is associated with a particular listed patient element 21.

Figure 8:
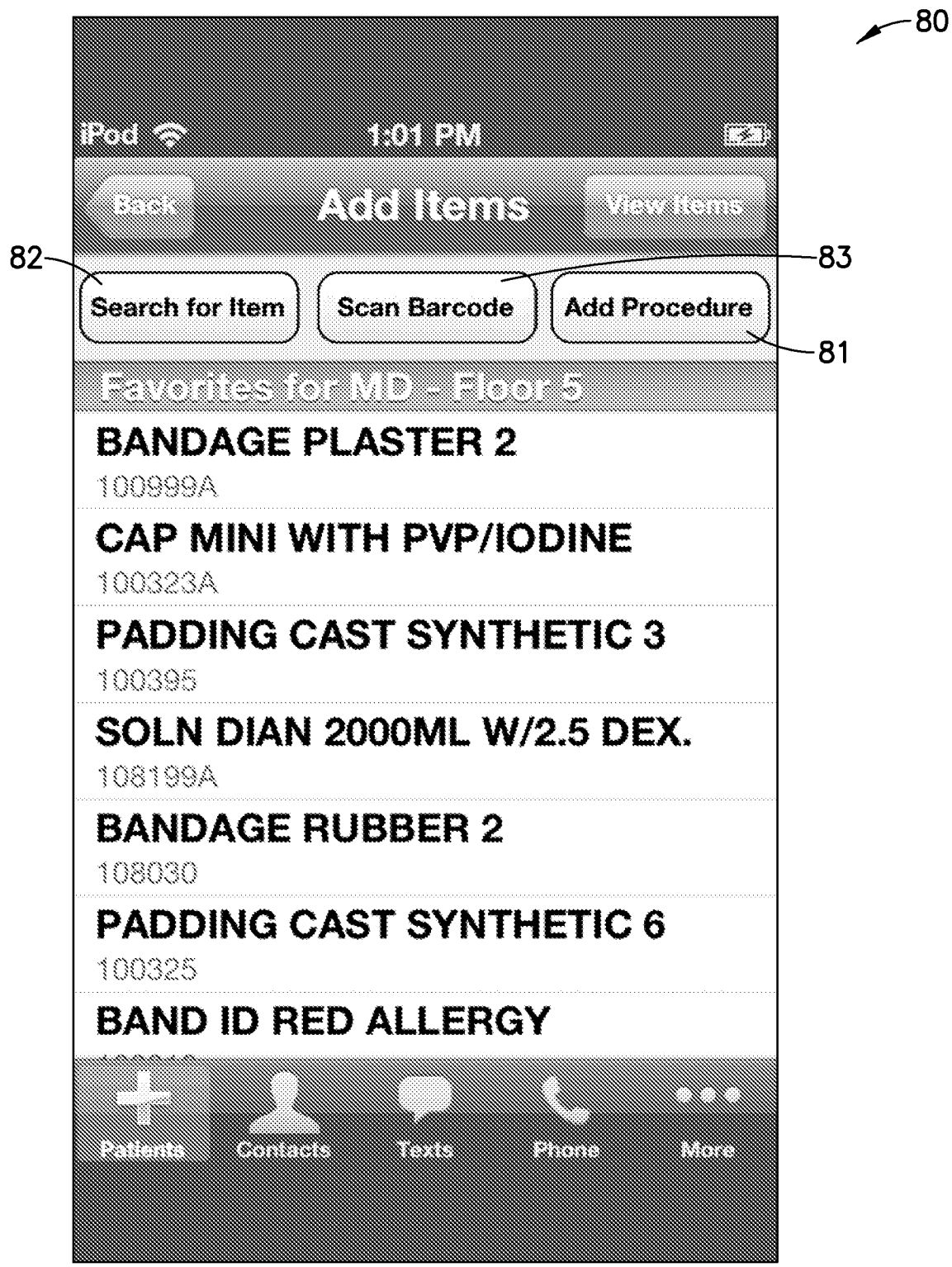
FIG. 8 is an exemplary user interface for billing user interface functionality.

With respect to billing interface element 40, the billing interface element 40 may be selectable by a user to enable control over a billing detail view 80 (see FIG. 8). A billing detail view 80 may display all of the billable services and goods for a particular listed patient element 21. This may include bandages, sutures, etc. The detail view 70 may also include allow a user to enter billing items for a particular listed patient element 21. For example, in one aspect of the disclosed embodiment, the user may click Add Procedure element 81 to add a billable procedure to the billing for a particular process pathway. This may allow a user to select from a number of goods and services which may be billed. In one aspect of the disclosed embodiment, the menu of items used to add a procedure may be configured to allow for express adding of procedures. That is, the menu of items listed to add a procedure may be contextual for each patient—the listing of items in the menu will only relate to the procedures relevant to a particular patient. This allows for the least amount of user interactions to add a procedure for billing. Further, adding a procedure may include number of quantities for a procedure already filled in with default quantities, which a user may change, allowing for simple addition of procedures that may be partially automatically generated. In one aspect of the disclosed embodiment, the selection from which a user may choose to add to the billing for a particular listed patient element 21 may be limited by certain practice areas relevant for the corresponding patient. For example, a patient admitted for a severe laceration may only present options related to treatment of lacerations for billing purposes in the billing detail view 80. In alternate aspects, any suitable means of presenting billable items may be presented. A user may also add billing items through other means. For example, the user may select the Search for Item element 82 which may allow a user to search for a billable item which may not normally appear under the Add Procedure element 81. The user may also select the Scan Barcode element 83, where billable items may be added by means of scanning a bar code. The user may also select items to add for Billing from a list of items (i.e. a sample list of items to be chosen from for billing purposes) to be billed to a particular patient. In alternate aspects, any suitable means of adding a billable item may be presented. The billing functionality embodied by the billing detail view 80 may be used to modify the particular clinical process information 21*a* associated with the listed patient element 21. In this sense, the billing functionality embodied by the billing detail view 80 may allow a mobile device to become a billing station directly without further data entry to establish the billing criteria on the system backend. The mobile device 16 may be the point where the complete or nearly complete billing data to effect a billable item may be gathered and entered for a particular listed patient element 21.

Figure 9:
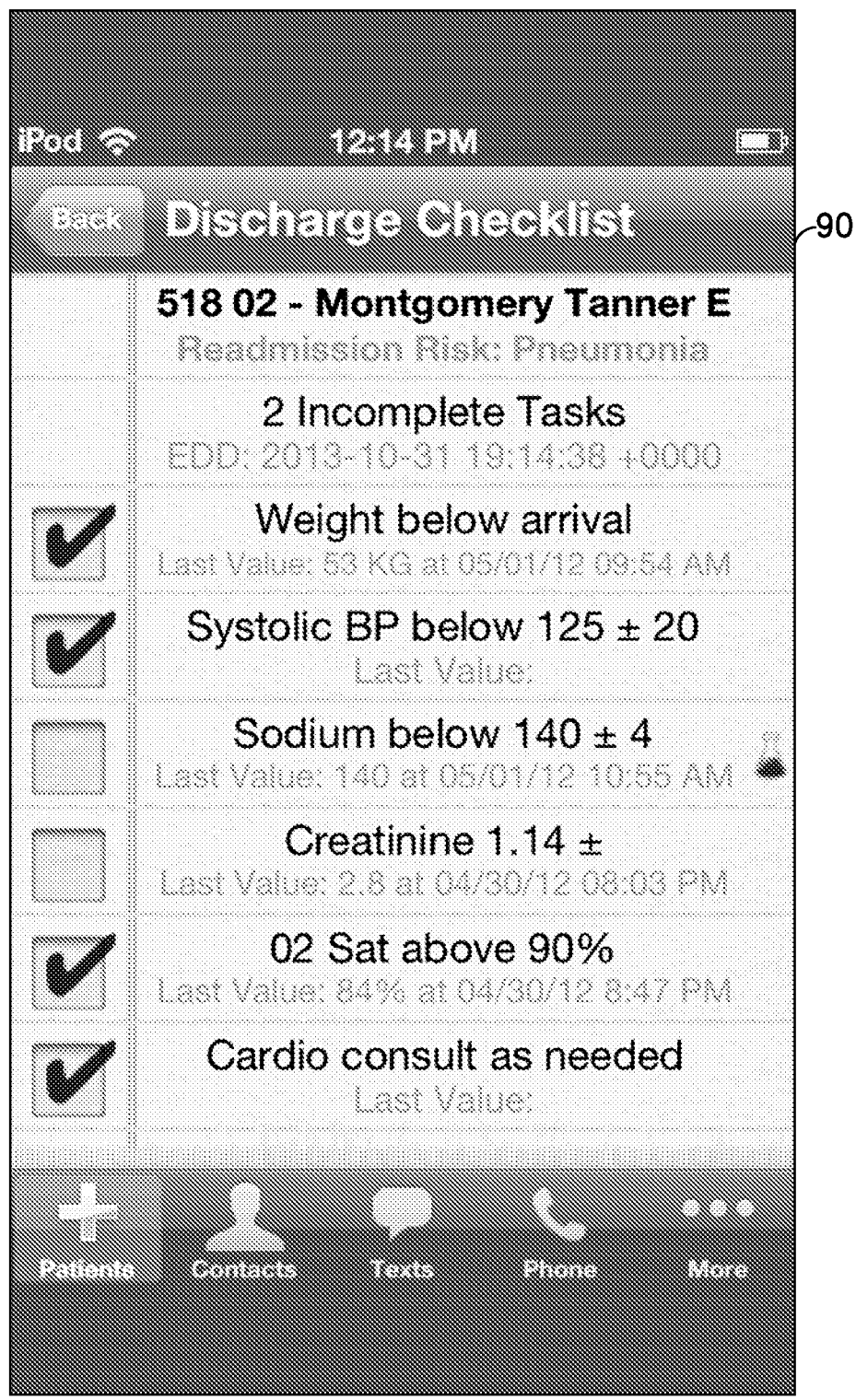
FIG. 9 is an exemplary user interface for a task list user interface functionality.

Referring now to Tasks interface element 38, the tasks interface element 38 may be selectable by a user. The tasks interface element 38 may enable control over a detail listing of the physical work tasks 91 associated with a particular listed patient element 21 (see FIG. 9), in this case, a patient/clinical process in a hospital and clinical facility context. In one aspect of the disclosed embodiment, a user may interact with the detail listing of physical work tasks 91 shown in FIG. 9. For example, a user may "check" a completed physical work task from the list. In alternate aspects, a user may also make changes to the list of physical work tasks presented in the detail list of physical work tasks.

Another system which may be available, though not shown in the Figures is that the system may make a Discharge Checklist functionality available for a particular process pathway. The discharge checklist may be automatically generated based on predetermined and customizable hospital procedures for a particular patient.

Figure 10:
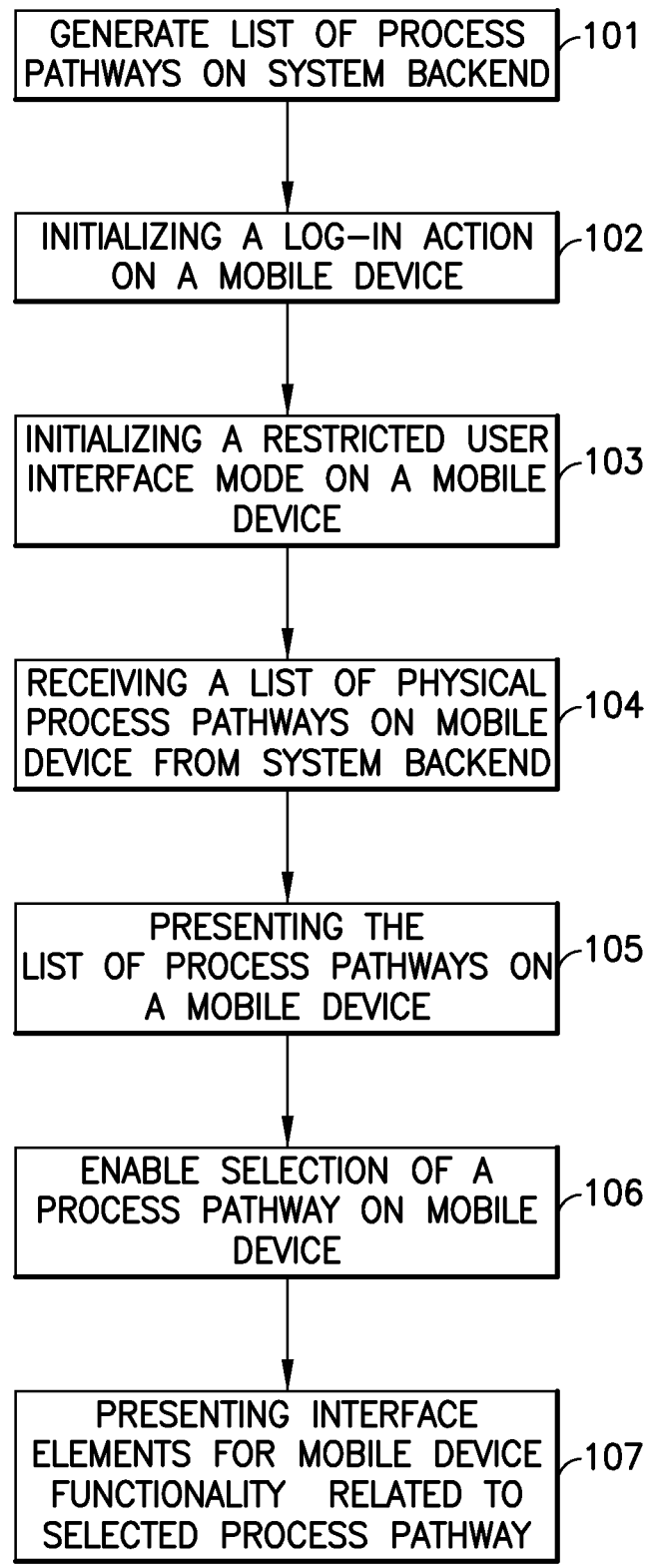
FIG. 10 is an exemplary flowchart illustrating the operation of a system for controlling and presenting process pathways.

Referring now to FIG. 10, FIG. 10 illustrates a block diagram illustrating a means of presenting a listing of listed patient element 21 (e.g. a listing of patients/clinical pathways) in accordance with an exemplary embodiment. At block 101, a system backend 11 may generate a list of process pathways. At block 102, a mobile device 16 may initialize a log-in action. As described previously, a log-in action may be, for example, activating a Mobile Heartbeat app. The log-in action may also use a user credential to complete a log-in action. In alternate aspects of the disclosed embodiment, the log-in action may also be an automated log-in action, for example, through the Quick Launch system as described in the Automated Login Initialization On Detection of Identifying Information (hereinafter "Quick Launch") as described in U.S. patent application Ser. No. 13/616,483 filed on Sep. 14, 2012, which was previously incorporated by reference herein in its entirety. At block 103, the initialization of a log-in action may place a mobile device in a restricted user interface mode. In one aspect of the disclosed embodiment, the restricted user interface mode may lack access to various mobile device functionalities. At block 104, a list of physical process pathways may be received on a mobile device 16 from the system backend 11. At block 105, the mobile device 16 may be configured to present the list of process pathways on the mobile device display. At block 106, the mobile device may be configured to enable the selection of a process pathway on the mobile device 16. At block 107, the selection of a process pathway on mobile device 16 may result in the mobile device presenting a set of interface elements corresponding to a set of mobile device functionalities related to the selected process pathway. In one aspect of the disclosed embodiment, the mobile device functionalities corresponding to the set of interface elements may be mobile device functionalities that were disabled by initializing a restricted user interface mode. Though the blocks presented in FIG. 10 appear to be presented in a particular sequence, it is noted that the blocks are not sequence determinative and each block may be activated or initiated in any suitable sequence. In yet alternate aspects, multiple blocks may be operating in parallel with other blocks.

It is noted that the mobile device functionalities 35-40 shown in FIG. 3B may be exemplary only and that any other suitable mobile device functionalities may be available or presented.

Further, it is noted that the system may also include a system for setting up and modifying the functionality of mobile devices. Similar to the differentiation of mobile device built-in functionalities disclosed previously, the system may also expedite the setup of mobile devices so that different mobile devices may have different functionalities with regards to the physical process pathways. This may allow for expedited setup and deployment of device functionality across the system on some or all of the mobile devices. Specifically, the system may allow for a quick one-step setup of mobile devices in the system.

Figure 11:
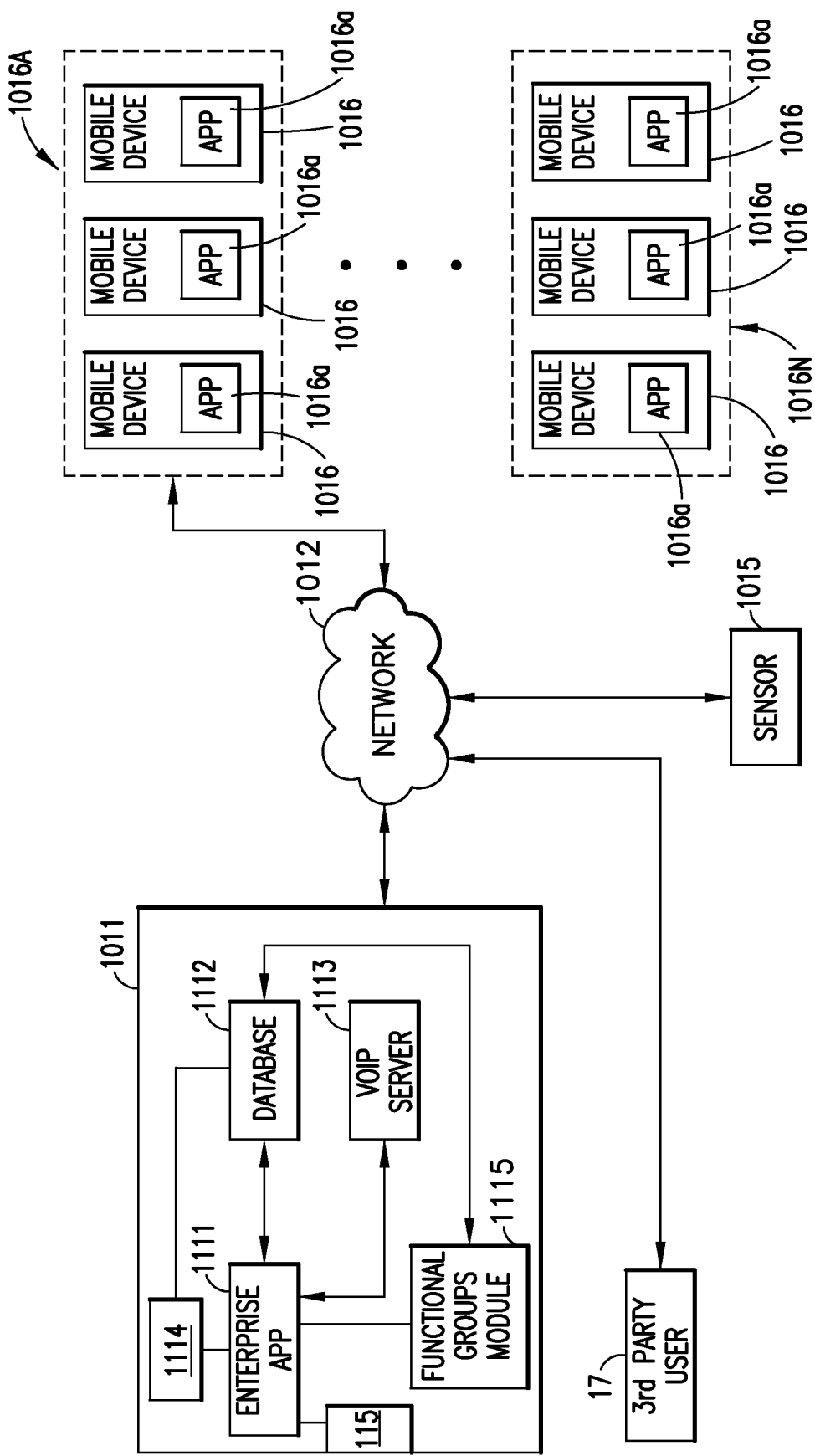
FIG. 11 is a schematic representation illustrating an overview of the system utilizing a system for controlling mobile device functionalities.

Referring now to FIG. 11, a block diagram of the system is shown. The system shown in FIG. 11 may substantially correspond to the system shown in FIG. 1. In addition to what was disclosed with respect the system backend 11 in FIG. 1, the system backend 1011 shown in FIG. 11 may also have a Functional Groups module 1115 which may be communicable with the Enterprise App 1111 and/or the database 1112. The Functional Groups module 1115 may take, in one aspect, the form of system configurations for devices and permissions and other applicable settings. In alternate aspects, the Functional Groups module 115 may take any suitable form The Functional Groups module 1115 may be configured to control or track or otherwise correlate certain data. For instance, the Functional Groups module 115 may be able to keep track of the correlation between a mobile device 1016 and a user account. In one aspect of the disclosed embodiment, the Functional Groups module 1115 may have a dynamic table that correlates a mobile device 1016A and a user account. Because all mobile devices 1016 may be fungible and the system is agnostic as to which mobile device 1016 a user is currently using, the dynamic table may be updated every time a user logs in with a mobile device 1016. The log-in action a user uses to log in may be a simple username and password login. However, in other aspects, the log-in may be an automated login, for example, the one described in Automated Login Initialization On Detection of Identifying Information (hereinafter "Quick Launch") as described in U.S. patent application Ser. No. 13/616,483 filed on Sep. 14, 2012, the disclosure of which was previously incorporated by reference herein in its entirety. In yet other aspects, the logging in may be a substantially one-step procedure for an expedited login—for instance, entering in a simple alphanumeric code. In yet alternate aspects, any suitable means of logging in may be used.

The Functional Groups module 1115 may also be used to define one or more functional groups of users logged into mobile devices 1016A-1016N. It should be noted that while the application may refer to functional groups of mobile devices 1016-1016N, what this means is that there may be functional groups 1016A-1016N which have mobile devices 1016 with users logged in on each mobile device 1016 that belong to their respective functional groups 1016A-1016N. Each of the functional groups 1016A-1016N may have at least one administrator or user defined rule with respect to the functionalities of the mobile devices 1016 that is associated with a user within a particular functional group 1016A-1016N. For example, a mobile device 1016 associated with a user that is part of functional group 1016A may have administrator or user defined rules that limit the mobile devices 1016 within that group to receive only a subset of the one or more physical process pathways generated by the system backend 1011. The mobile device 1016 within the functional group 1016A may, in effect, only receive the physical process pathways that may be relevant to the user that is logged into the mobile device 1016 that is within the functional group 1016A when the user is a part of functional group 1016A. The mobile device 1016 would not receive physical process pathways 21 (e.g. patients/clinical pathways) that are not relevant to a user or the user does not have permission or access to use.

In other aspects, the Functional Group module 1115 may also generate functional groups of users which may have administrator defined rules defining the functionality of a mobile device 1016 that is associated with a user that is part of a functional group 1016A-1016N. For instance, a mobile device that has a user associated with a functional group 1016A may have different functionalities from a mobile device 1016 with a user that belongs to a different functional group 1016N. This may mean that devices of different functional groups may not be able to run the same kinds of built in applications or functions. For instance, a mobile device 1016 of functional group 1016A may be able to access billing for patients because the user associated with the mobile device 1016 has permissions to access billing because they are administrative personnel. However, a different user using another mobile device 1016 from a functional group 1016B may not have permission to access billing functionalities for a particular listed patient element 21 because they are radiology technicians and thus do not have access to billing. This difference in functionalities may not be limited to billing but can be any suitable functionality of a device, including those shown above. For example, this may include access to functionalities involving lab results, photography, orders or pharmacy or tasks with respect to a particular physical process pathway. Further, the functional groups 1016A-1016N may also have administrator or user defined rules which allows for other differing functionalities between the mobile devices 1016 of different functional groups 1016A-1016N. For instance, mobile devices 1016 of one functional group 1016A may have receive different alerts with respect to physical process pathways than mobile devices 1016 of a different functional group 1016B. Further, the functional groups may also have administrator or user defined rules which controls permissions and authorization to act upon certain process pathways. A mobile device 1016 associated with a user in functional group 1016A may also have permission and authorization to act upon certain physical process pathway items that a mobile device 1016 associated with a different user in another functional group 1016B may not. For instance, in a situation where nurses are defined by functional groups associated with departments, a nurse assigned to work in a certain department may receive authorization to act upon the physical process pathways of patients within her department. The nurse may not have access to the physical process pathways of patients within a different department because the nurse may not have permission to act upon those physical process pathways.

In yet other aspects, the Functional Groups module 1115 may define any other suitable forms of functional groups, where the users within a functional group 1016A-1016N may have a different capability or functionality based on the functional group 1016A-1016N they belong to. For instance, one example of a functional group may be Role Groups. This may exist where a functional group 1016A-1016N is defined by the common roles of the users within the functional group. This may occur in cases where we have a functional group comprised, for instance, of Emergency Room nurses. Where a hospital or healthcare emergency code is issued such as a "Code Blue" for a patient requiring immediate attention, there may be a functional group that is comprised of Emergency Room nurses which has an administrator defined rule which broadcasts the "Code Blue" to all Emergency Room nurses. Thus, when a "Code Blue" is issued, the Role Group of Emergency Room nurses may receive, on their mobile devices 1016, a broadcast or an alert for the "Code Blue" indicating something that requires their immediate attention.

Another possible type of functional groups that may be defined by the Functional Groups Module 1115 may include functional groups categorized by organizational hierarchy. For instance, the system may serve multiple hospitals, each hospital having multiple wards and each wards having multiple beds. A functional group generated by the Functional Groups Module 1115 may create a functional group where the healthcare organization (in a healthcare context) is broken down into hospitals so that a mobile device 1016 belonging to a functional group for one hospital may have different functionalities and access to information than a mobile device 1016 belonging to another functional group for another hospital. The mobile devices 1016 for users belonging to different functional groups for different hospitals may receive different alerts and broadcasts in accordance with their respective functional groups. Similarly, each functional group—in this case a hospital, may be made up of sub-functional groups. For instance, a functional group such as a hospital may be divided into smaller subset functional groups like individual wards of a hospital. Users who belong to a functional group corresponding to one ward may receive different functionalities and data access and alerts compared to a user belonging to a different functional group corresponding to a different ward within the hospital. Wards may further be broken down into smaller sub-functional groups. For instance, the wards may be broken down into individual beds with users associated with (i.e. assigned) certain beds and the patients assigned to those beds to care for. Users who are a part of a functional group for a particular set of beds may have different functionalities, data access and alerts compared to a user belonging to a functional group for a different set of beds.

Figure 11A:
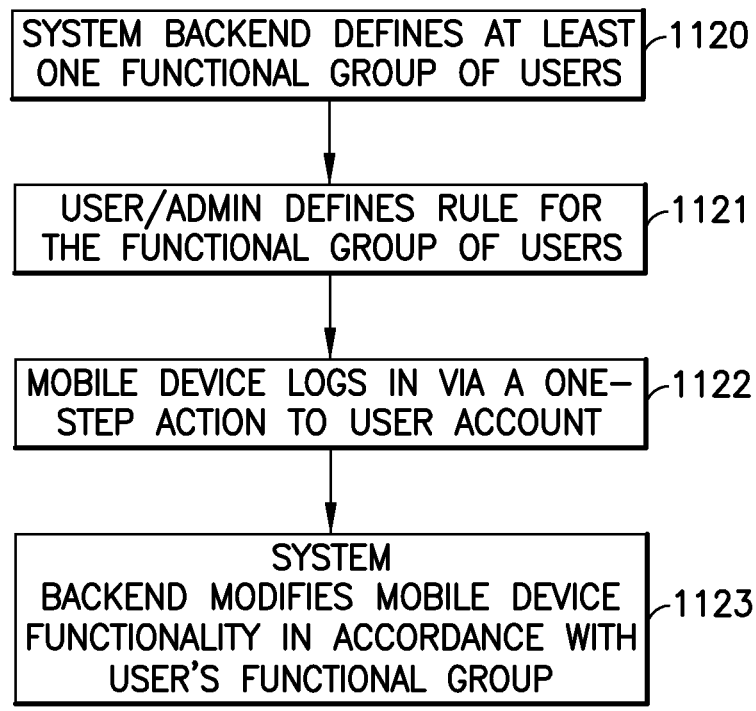
FIG. 11A is a flow diagram of an exemplary operation for controlling a mobile device functionality.
Figure 11B:
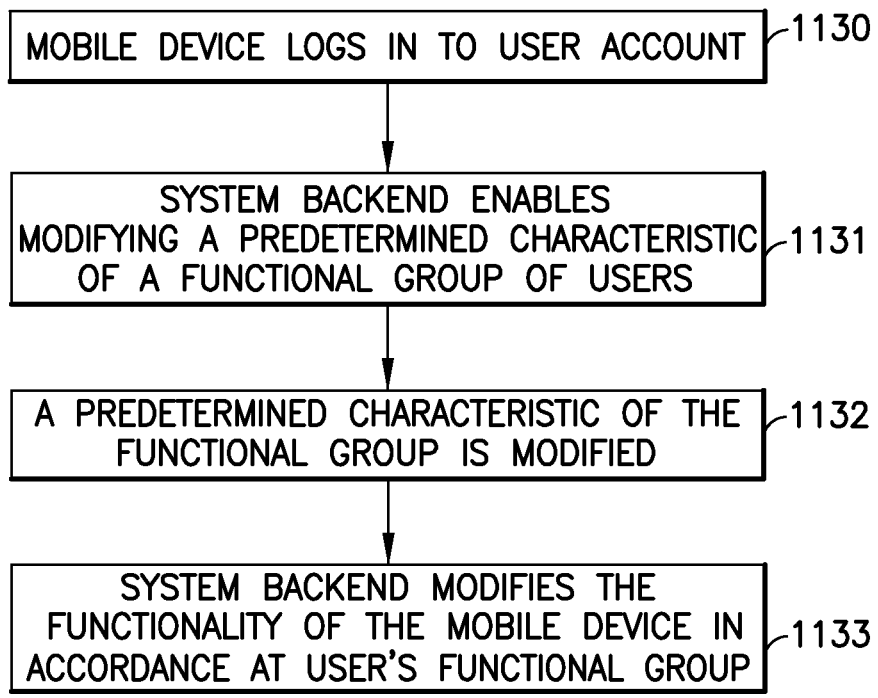
FIG. 11B is a flow diagram of an exemplary operation for controlling a mobile device functionality.

Referring now to FIGS. 11A and 11B, a block diagram of how the expedited setup and control of functionalities of mobile devices 1016A-1016N is shown. The block diagrams of FIGS. 11A and 11B are exemplary only and simplified and may be carried out in any other suitable means. Referring now to FIG. 11A, an expedited setup system for the functionality of mobile devices 1016 is shown. At block 1120, the system backend 1011 may be configured to define at least one or more functional groups of users with the Functional Groups Module 1115. The functional groups may be manually created by an administrator or a user of the system. However, the functional groups of users may also be, for instance, automatically generated by the system backend 1011 and the Functional Groups Module 1115. When a functional group is created by the Functional Groups Module 1115, the functional group may include a rule for the functional group which defines certain aspects as to the functionality of a mobile device 1016 (see block 1121) that is associated with a user within the functional group. As discussed above, this may include, for instance, certain functionalities such as apps or other mobile device 1016 functionality, or ability to receive certain portions of the physical process pathways 21, or permissions to receive certain alerts and broadcasts, or authorizations to act upon a certain process pathways. The rule may be defined by a user or an administrator with the Functional Groups Module 1115. At Block 1122, a user with a mobile device logs in to a user account stored the system backend 1011. This log-in action may be via a standard log-in procedure. However, in alternate aspects, may be an automated login procedure like "Quick Launch" as described in U.S. patent application Ser. No. 13/616,483 filed on Sep. 14, 2012, which as incorporated by reference herein in its entirety previously. In yet alternate aspects, the log-in action may be a substantially one-step action, for instance, entering an alphanumeric code into the device. When a log-in procedure to a user account is successful, at block 1123, the system backend 1011 will initiate operations whereby the system backend 1011 will modify the mobile device 1016 by altering the functionality of the mobile device 1016 according to the functional groups that the user account belongs to. Thus, a device that may have no initial set-up or data may have an expedited set up in terms of functionality through simply a log-in action, for instance, a one-step log-in action.

Referring now to FIG. 11B, the system may also alter the functionality of a mobile device 1016 even when a mobile device 1016 is already logged on. For instance, at block 1130, a user logs into a user account on a mobile device 1016. At block 1131, the system backend 1011 enables the modification of a predetermined characteristic of a functional group of users. This may be done by, for instance, accessing the Functional Groups Module through a user interface. In alternate aspects, any suitable means of enabling the modification of a predetermined characteristic of a functional group of users may be possible. The predetermined characteristic of the functional group may be any suitable characteristic of the functional group. For instance, the predetermined characteristic may include rules within a functional group related to the functionality, access to data, permissions, alerts received by the mobile devices associated with users of a functional group. In alternate aspects, the predetermined characteristic may be any suitable characteristic of the functional group which may alter the functionality of a mobile device 1016 associated with a user of that functional group. At block 1132, the predetermined characteristic of the functional group is modified by the user or administrator. At block 1133, the system backend 1011 is configured to modify the functionality of the mobile device 1016 associated with a user from the functional group with the modified predetermined characteristic. The system backend 1011 is able to propagate the modification to the functional group to all users immediately through the network, thus allowing for the expediting of customization of functionalities of mobile devices within a functional group.

Referring now to FIG. 12-17, some exemplary user interfaces of the Functional Group Module 1115 may be shown, the user interfaces may be used to facilitate the creation of functional groups and the administrator or user defined rules which modify mobile device functionalities for the functional group. The exemplary user interfaces shown in FIG. 12-17 may also be used to update user defined rules or predetermined characteristics of a functional group as described above.

Referring now to FIG. 12, an exemplary user interface of the Functional Groups module 1115 may be shown. The user interface of the Functional Groups module 1115 may show a user interface for the managing of mobile devices and users. The user interface 1200 shown in FIG. 12 may be the user interface representation of the dynamic table that correlates a user with a mobile device 1016 after a user logs in with the mobile device 1016. The Manage Devices user interface 1200 shown in FIG. 12 may include, for instance a Serial # field 1201. The Serial # field 1201 is the hardware identifier for mobile devices 1016. The Manage Devices user interface 1200 may also have a User Name field 1202—this may be the Name of a device. Additional information about the correlation may be shown, for instance, the model of the hardware device 1203. In the exemplary user interface 1200 shown in FIG. 12, the models of the devices are all iPhones, however, in alternate aspects, any suitable device may be used, including devices using webOS, Android, Windows Phone, FirefoxOS, ChromeOS or any other suitable device. Other information disclosed in the Manage Devices user interface 1200 may include device IP (i.e. Internet Protocol addresses. The Manage Devices user interface 1200 may also have a flag which indicates whether a device is a shared device or not 1205. Because devices may be fungible, devices may be shared between multiple users. The Manage Devices user interface 1200 may also indicate the software version of the device 1206, the Last User to be logged into a device 1207—this is the user that is currently associated with the mobile device 1016 within the system. As can be seen, the table correlates a mobile device 1016 hardware identifier (i.e. the Serial # field 1201) with the identifier of a user account (i.e. Last User 1207). Other data tracked by the Manage Devices user interface 1200 may include when the device was last Heard in the network 1208 and whether the device is authorized to work with the system 1209. Buttons for Update and Delete 1210 are also available to allow administrators to manage devices directly—either to update a mobile device 1016's information or to delete a mobile device 1016 from the system.

Referring now to FIG. 13, one of the functional groups that can be created and managed by the Functional Groups Module 1115 may be Security Groups. As can be seen in FIG. 13, an exemplary Edit Security Group user interface 1300 is shown. Though the exemplary Edit Security Group user interface 1300 is currently only shown to edit settings for a security group, a security group may be created with a substantially similar user interface with similar fields. The Edit Security Group user interface 1300 may have fields which have descriptive data for a security group, for instance, the Security Group Name 1301 and the Security Group Description 1302. Underneath the descriptive data 1301 and 1302 includes a listing of permissions 1303-1311 which a user or administrator may modify. Though the exemplary Edit Security Group user interface 1300 only shows a limited number of permissions, any suitable number of permissions may be available and can be edited in any suitable form. Users and administrators may also add Permission settings to the Edit Security Group user interface 1300 for a security group. For instance, some of the possible permissions for a Security Group shown in Edit Security Group 1300 may include whether a user in a Security Group has Clinical Data access 1303, whether the user can Set Patient 1304, whether the user can do staff assignments 1305, whether the user can confirm lab orders 1306, and whether the patient can access Patient Photography 1306. As can be seen, some of the security permissions for a security group may relate to access to certain built-in device functionalities such as access to Photography, Billing, Orders, Tasks, Lab Results or Notes or any other functionality for a listed patient element 21 as previously described. The Edit Security Group user interface 1300 may also control access to Patient Billing 1308, whether On Call/Consultations are enabled 1309, whether a user can receive nurse calls and can escalate nurse calls 1309 and whether a user can silence telemetry alerts for a patient 1311. The permissions, as noted, are only exemplary and can take any other form and may include other suitable permissions and rules relating to the functionality of a mobile device not shown in FIG. 13.

Figure 14:
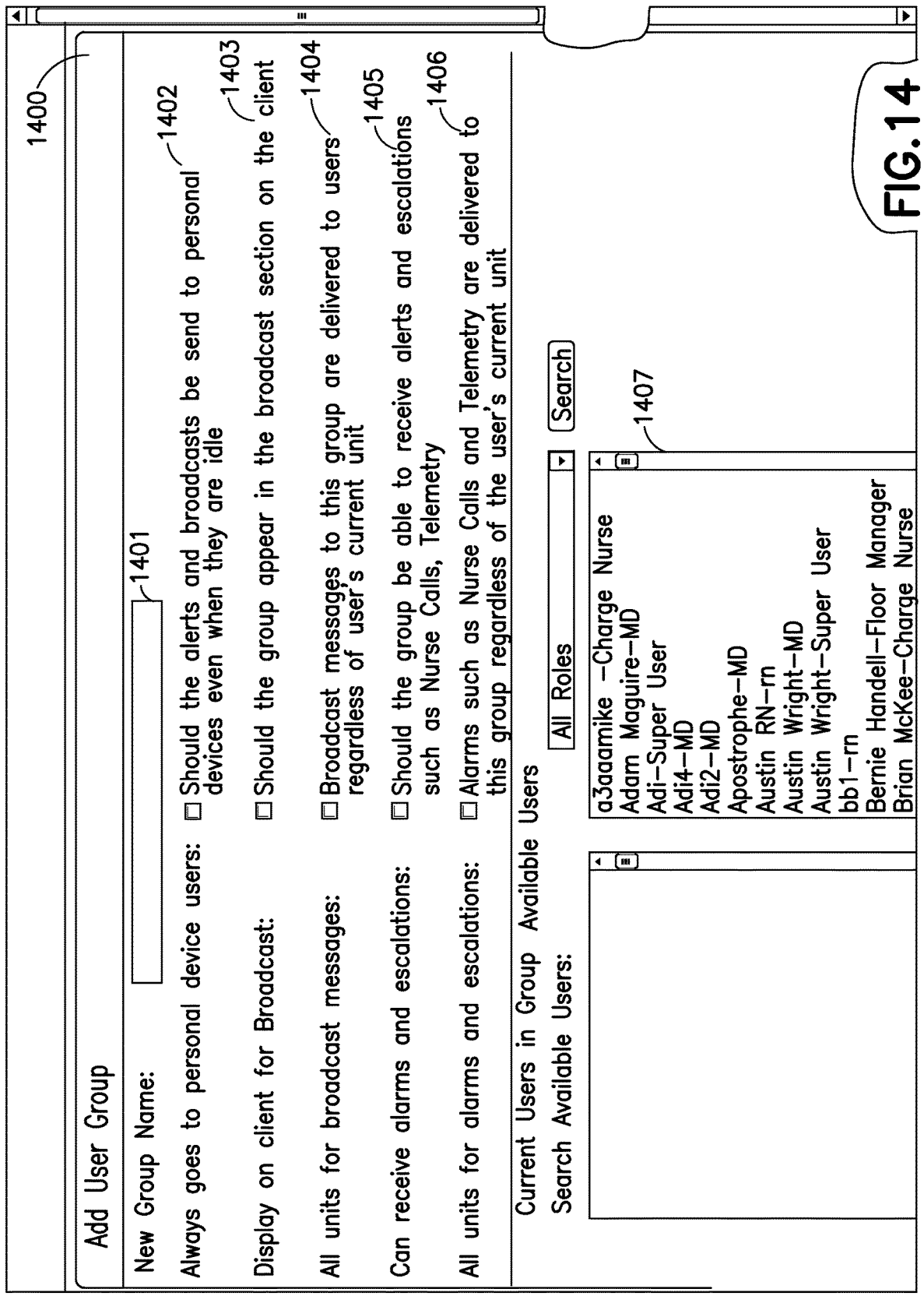
FIG. 14 is an exemplary user interface for adding user groups.

Referring now to FIG. 14, another functional group which may be created with the Functional Groups module 1115 may be User Groups. As discussed previously, the User Groups may have include additional rules on the functionality of users within a group that may not be available in a Security Group as shown in FIG. 13. FIG. 14 shows an Add User Group user interface 1400. The Add User Group user interface 1400 is exemplary only and may take any other suitable form. Though the Add User Group user interface 1400 shown in FIG. 14 allows an administrator to create a User Group, it is realized that a User Group may also be edited through a similar user interface to that shown in FIG. 14. The Add User Group user interface 1400 may have several additional rules affecting the functionality of mobile devices. In addition to the Group Name 1401, the User Group may have rules which controls whether alerts and broadcasts can be sent to personal devices even when idle 1402, whether the group can appear in the broadcast section on the client 1403, whether broadcasting messages to a user group are delivered to users regardless of user's current unit 1404, whether the group should be able to receive alerts and escalations 1405 and whether alarms are delivered to the users in the group regardless of a user's current unit. Within the Current Users Group section 1407, a user or administrator may select which users will be part of the User Group. The rules shown within the Add User Group user interface 1400 is not limited by the rules shown in FIG. 14, but may include any other rules, including rules which may be defined by an administrator or a user.

Figure 15:
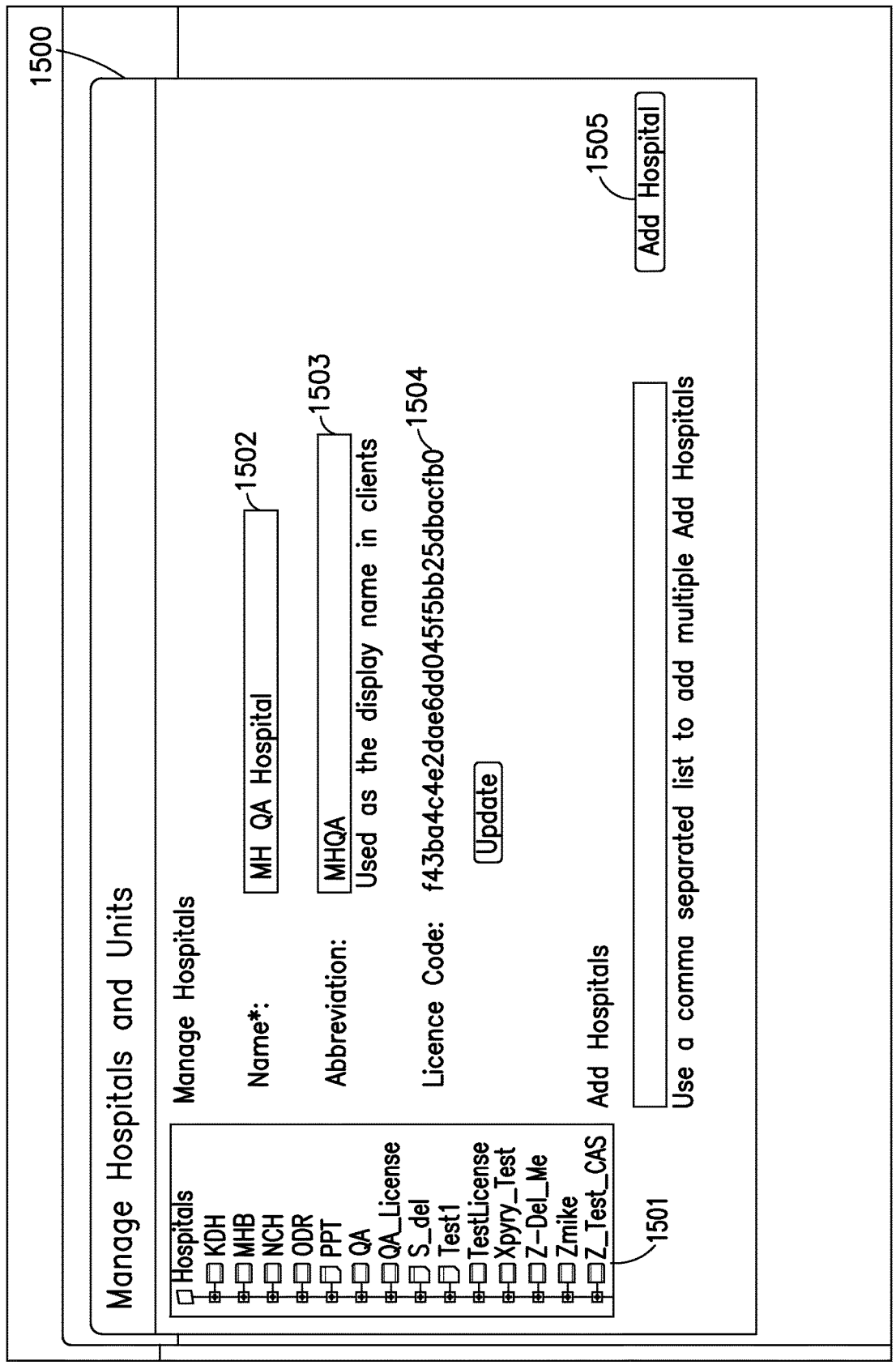
FIG. 15 is an exemplary user interface for managing hospitals.
Figure 16:
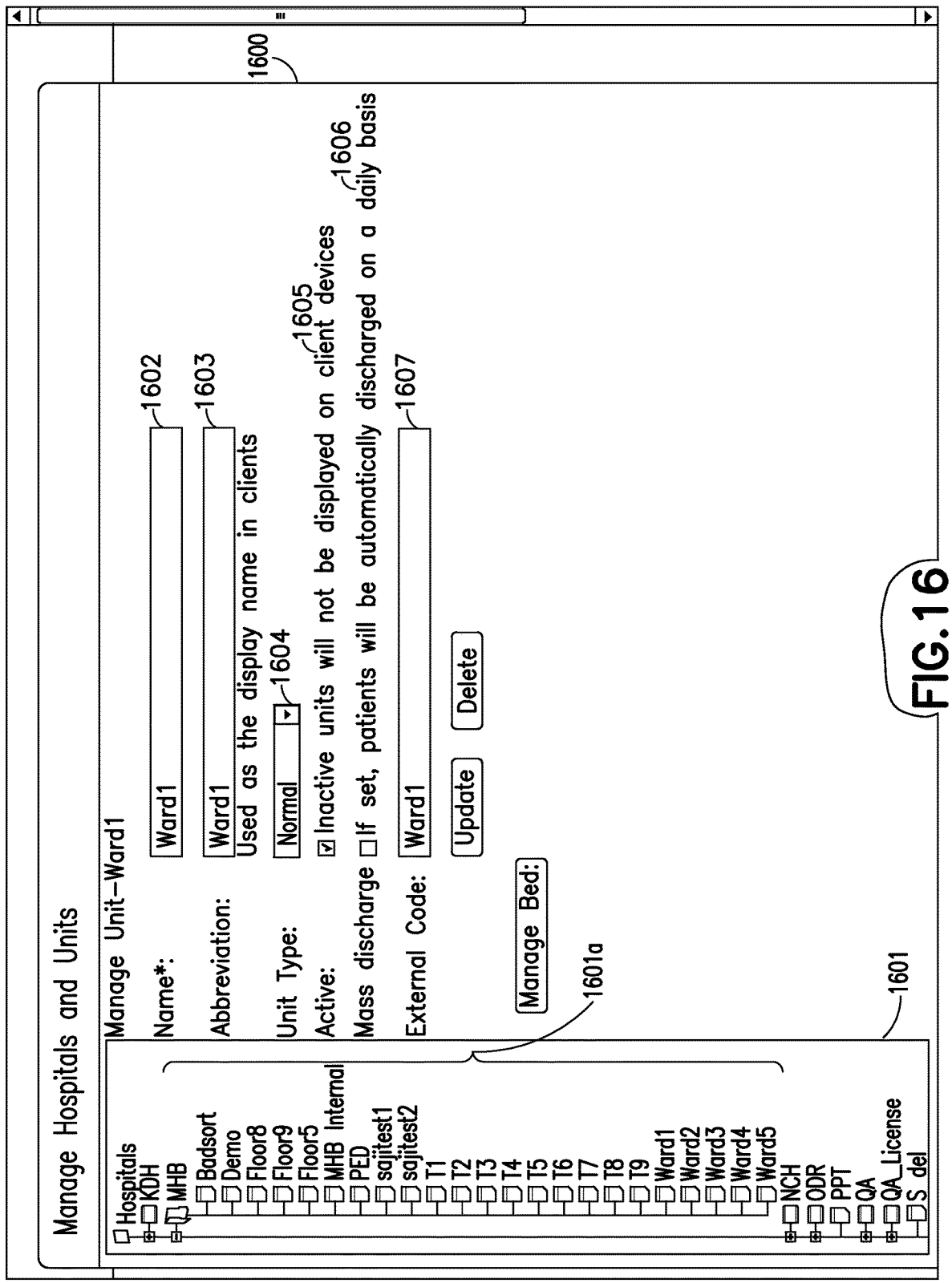
FIG. 16 is an exemplary user interface for managing wards.
Figure 17:
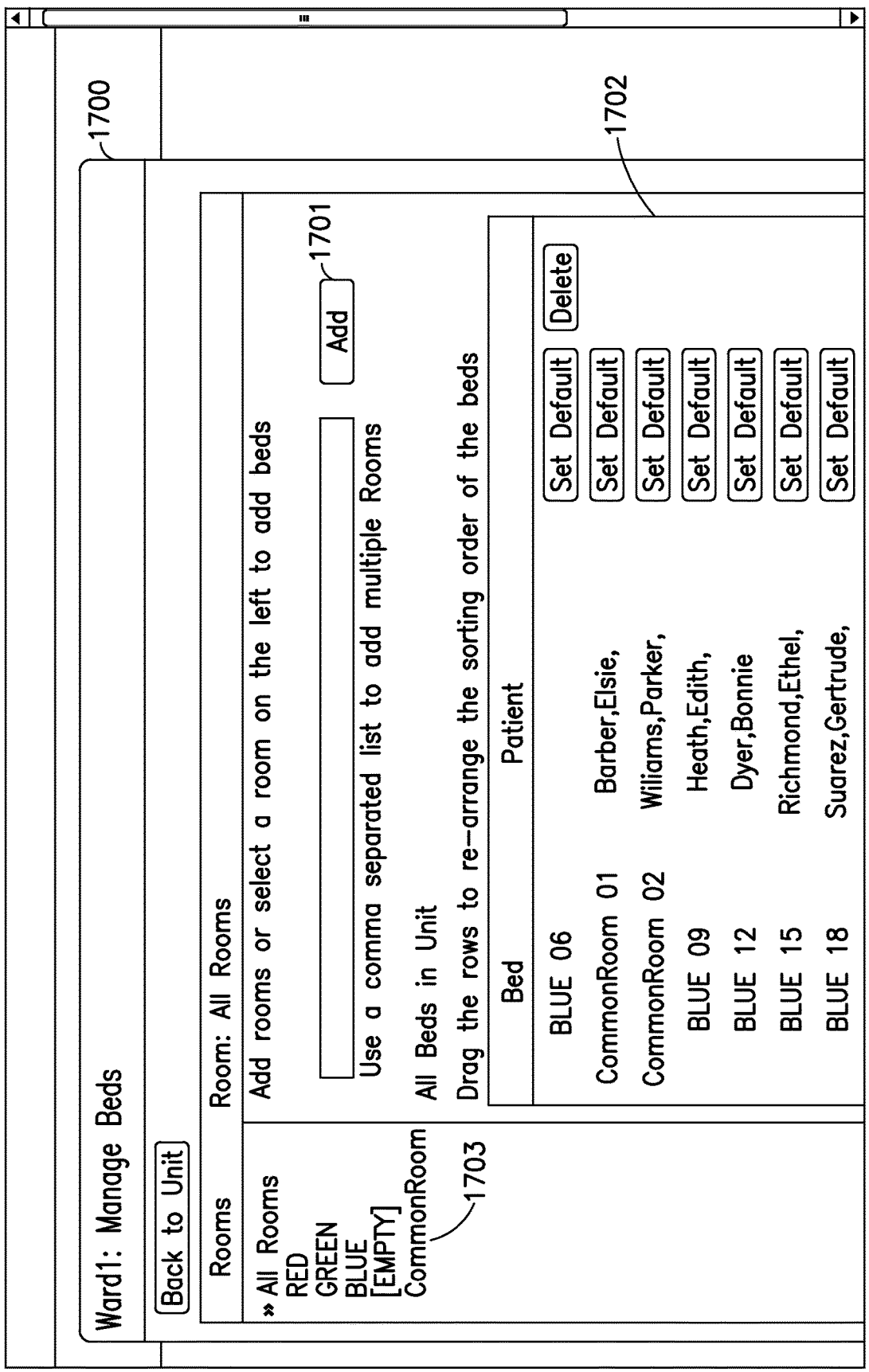
FIG. 17 is an exemplary user interface for managing beds.

Referring now to FIG. 15-17, another functional group which may be created with the Functional Groups module 1115 may be organizational groups. As discussed previously, functional groups may be created to reflect organizational or geographic structures of an organization. In a medical context, for instance, this may involve the division of a healthcare system to smaller and smaller units. In FIG. 15, a user interface for Managing Hospitals and Units user interface 1500 may be seen. The Manage Hospitals and Units user interface 1500 shown in FIG. 15 is exemplary and may take any other suitable form. The Manage Hospitals and Units user interface 1500 breaks down large healthcare organizations into smaller units. In the aspect shown in FIG. 15, a healthcare organization may be broken down into hospitals. Each hospital may have a Name 1502, an abbreviation 1503 and a License code 1504. The license code 1504 may be, for instance, the license for a hospital to run within a state, but may be any other suitable identifier for the hospital. In the Manage Hospitals and Units user interface 15, hospitals may also be added by a user or an administrator via the Add Hospital function 1505. In the tree menu 1501, an organization of the Healthcare Organization may be broken down by multiple hospitals. Referring now to FIG. 16, where the tree menu shown in 1601 shows one of the hospitals listed in the tree menu 1601 is expanded to show a number of different wards 1601*a* within the hospital. The management of wards may be done similarly as that shown in FIG. 15 for the management of hospitals. The user interface 1600 used by a user or administrator may include descriptors such as a Name 1602 of a ward and the abbreviation of a ward 1603. The Manage Ward user interface 1600 may also allow a user to define the unit type 1604 of a ward—for example—Intensive Care wards versus Outpatient Care wards. In alternate aspects, any suitable type of unit wards may be specified. A user or an administrator may also specify whether a ward is active (see Active status 1605) or not within a particular hospital. A user or administrator may also set to enable or disable daily discharge using the Mass Discharge option 1606. The User or administrator may also give a ward an External Code 1607. The Manage Hospitals and Wards user interfaces shown in FIGS. 15 and 16 are exemplary and may include other options not shown in FIGS. 15 and 16. In alternate aspects, any additional options suitable for management of Hospitals and Wards may be used.

Referring now to FIG. 17, a user or administrator may further manage the number of Beds within a Ward created and managed in FIG. 16. As shown in side menu 1703—each ward may be broken down further to rooms and within each room, there may be a number of beds shown in Bed Listing 1702. A user or administrator may also add rooms or add beds to existing rooms via the Add Rooms option 1701.

The Functional Groups created and shown in FIGS. 15-17 may create rules where users who are a part of a functional group for a particular set of beds or wards or hospitals may have different functionalities, data access and alerts compared to a user belonging to a functional group for a different set of beds, wards or hospitals. In alternate aspects, the functional groups created and shown in FIGS. 15-17 may further be used as a resource tracking system—for instance, to track the availability of beds within wards. In yet other aspects, any suitable uses many be used with the Functional groups created and shown in FIGS. 15-17

In one aspect of the disclosed embodiment, a system for presenting a clinical process of a patient in a clinical facility is disclosed having a network, a system backend communicable with the network, and at least one mobile device communicable with the system backend via the network, the mobile device comprising a mobile processor and a display, the mobile processor configured to operate in at least one first user interface mode and at least one second user interface mode, where the mobile processor is configured to enable the operation of at least one built-in function when operating in the at least one first user interface mode and where the mobile processor is configured to disable the operation of the at least one built-in function when operating in the at least one second user interface mode. The mobile processor operating in the at least one second user interface mode is configured to present a list of one or more patients each with a corresponding clinical process, each patient listing configured to re-enable access to the at least one built-in function associated with the corresponding clinical process of the listed patient.

In accordance with a first aspect of the disclosed embodiment, wherein the at least one built-in function have a different predetermined characteristic for each corresponding clinical process of the listed patient.

In accordance with a first aspect of the disclosed embodiment, wherein each clinical process has a different predetermined characteristic shared with the at least one built-in function associated with the corresponding clinical process of the listed patient.

In accordance with a first aspect of the disclosed embodiment, wherein the system backend comprises a single server or multiple servers.

In accordance with the first aspect of the disclosed embodiment, wherein the system backend comprises multiple servers.

In accordance with the first aspect of the disclosed embodiment, wherein the system backend comprises multiple processors configured to operate in parallel.

In accordance with the first aspect of the disclosed embodiment, wherein the system backend may comprise a cloud service provider.

In accordance with a first aspect of the disclosed embodiment, wherein the at least one second user interface mode may be activated by a log-in action.

In accordance with a first aspect of the disclosed embodiment, wherein the log-in action is an automated log-in action.

In accordance with a first aspect of the disclosed embodiment, wherein the log-in action uses a user credential.

In accordance with a first aspect of the disclosed embodiment, wherein the data related to each respective pathway is stored on the system backend.

In accordance with a first aspect of the disclosed embodiment, wherein the at least one built-in function comprise an interface for enabling control of laboratory results for the corresponding clinical process of the listed patient.

In accordance with a first aspect of the disclosed embodiment, wherein the at least one built-in function comprise an interface for enabling control of pharmacy results for the corresponding clinical process of the listed patient.

In accordance with a first aspect of the disclosed embodiment, wherein the at least one built-in function comprise an interface for enabling a camera and camera view for the corresponding clinical process of the listed patient.

In accordance with a first aspect of the disclosed embodiment, wherein the at least one built-in function comprise an interface for controlling open orders for the corresponding clinical process of the listed patient.

In accordance with a first aspect of the disclosed embodiment, wherein the at least one built-in function comprise an interface for controlling billing for the corresponding clinical process of the listed patient.

In accordance with a first aspect of the disclosed embodiment, wherein the at least one built-in function comprise an interface for controlling tasks for the corresponding clinical process of the listed patient.

In accordance with a first aspect of the disclosed embodiment, wherein each patient listing defines a patient module on the system backend that comprises a set of clinical process information associated with the corresponding clinical process and an interface configured to re-enabling access to the at least one built-in function when the mobile processor is operating in the at least one second user interface mode.

In accordance with a first aspect of the disclosed embodiment, wherein the interface configured to re-enabling access to the at least one built-in function within the patient module effects action of the at least one built-in function upon the clinical process information associated with the respective patient module in conformance with HIPAA rules.

In accordance with a second aspect of the disclosed embodiment, a system for presenting a clinical process of a patient in a clinical facility is disclosed having a network, a system backend communicable with the network, at least one mobile device communicable with the system backend via the network, the mobile device comprising a mobile processor and a display, the mobile processor being configured to present multiple user interface modes on the display, the mobile device having at least one restricted user interface mode whereby at least one mobile device functionality is disabled, where the initialization of the at least one restricted user interface mode of the multiple user interface modes enabling the mobile processor to present on the display a list of one or more patients, each with a corresponding clinical process. The mobile processor is configured to enable each patient listing to be selectable on the display and is further configured to present a selection of interface elements on the display in response to a selection of the patient listings, each interface element representing a different mobile device functionality associated with the corresponding clinical process of the listed patient, where the selection of each interface element is configured to re-enable access to the respective different mobile device functionality associated with the corresponding clinical process of the listed patient, each mobile device functionality having a different predetermined characteristic for each respective corresponding clinical process of the listed patient.

In accordance with a second aspect of the disclosed embodiment, wherein each mobile device functionality is restricted to data related to the corresponding clinical process of the listed patient associated with each mobile device functionality according to the different predetermined characteristic.

In accordance with a second aspect of the disclosed embodiment, wherein the system backend comprises a single server or multiple servers.

In accordance with the second aspect of the disclosed embodiment, wherein the system backend comprises multiple servers.

In accordance with the second aspect of the disclosed embodiment, wherein the system backend comprises multiple processors configured to operate in parallel.

In accordance with the second aspect of the disclosed embodiment, wherein the system backend may comprise a cloud service provider.

In accordance with a second aspect of the disclosed embodiment, wherein the initialization of the at least one restricted user interface mode of the multiple user interface modes is enabled through a log-in action.

In accordance with the second aspect of the disclosed embodiment, wherein the log-in action uses a user credential.

In accordance with a second aspect of the disclosed embodiment, wherein the log-in action is an automated log-in action.

In accordance with the second aspect of the disclosed embodiment, wherein the user credential determines the selection of interface elements representing a mobile device functionality related the one process pathway.

In accordance with the second aspect of the disclosed embodiment, wherein the data related to each respective process pathway is stored on the system backend.

In accordance with the second aspect of the disclosed embodiment, wherein the list of one or more patients is generated by the system backend.

In accordance with a second aspect of the disclosed embodiment, wherein the mobile device having at least one restricted user interface whereby a predetermined set of mobile device functionalities are disabled.

In accordance with a second aspect of the disclosed embodiment, wherein the system backend is configured to generate multiple lists of one or more patients.

In accordance with a second aspect of the disclosed embodiment, wherein the at least one built-in function comprise an interface for enabling control of laboratory results for the corresponding clinical process of the listed patient.

In accordance with a second aspect of the disclosed embodiment, wherein the at least one built-in function comprise an interface for enabling control of pharmacy results for the corresponding clinical process of the listed patient.

In accordance with a second aspect of the disclosed embodiment, wherein the at least one built-in function comprise an interface for enabling a camera and camera view for the corresponding clinical process of the listed patient.

In accordance with a second aspect of the disclosed embodiment, wherein the at least one built-in function comprise an interface for controlling open orders for the corresponding clinical process of the listed patient.

In accordance with a second aspect of the disclosed embodiment, wherein the at least one built-in function comprise an interface for controlling billing for the corresponding clinical process of the listed patient.

In accordance with a second aspect of the disclosed embodiment, wherein the at least one built-in function comprise an interface for controlling tasks for the corresponding clinical process of the listed patient.

In accordance with a second aspect of the disclosed embodiment, wherein the processor is configured to present the selection of interface elements from within a selected corresponding clinical process of the listed patient on the display.

In accordance with a second aspect of the disclosed embodiment, wherein the processor is configured so that selection of each interface element is dependent on the selected corresponding clinical process of the listed patient.

In accordance with a second aspect of the disclosed embodiment, wherein the mobile device has an unrestricted user interface mode, wherein when in the unrestricted user interface mode, the processor is configured to present for selection of at least one of the interface elements outside the selection of patient listings.

In accordance with a second aspect of the disclosed embodiment, wherein each listed patient defines a patient module on the system backend that comprises a set of clinical process information associated with the corresponding clinical process and each of the interface elements configured for re-enabling access to the at least one mobile device functionalities when the mobile processor becomes operative in the at least one restricted user interface mode.

In accordance with a second aspect of the disclosed embodiment, wherein the selection of interface elements configured to re-enabling access to the at least one mobile device functionality within the patient module effects action of the at least one mobile device functionality upon the set of clinical process information associated with the respective patient module in conformance with HIPAA rules.

In a third aspect of the disclosed embodiment, a user interface for presenting a clinical process of a patient in a clinical facility is disclosed having at least one fungible mobile device comprising a display, the at, least one fungible mobile device further having multiple user interface modes presentable on the display, wherein the initialization of at least one restricted user interface mode of the multiple user interface modes, having a predetermined set of mobile device functionalities disabled, enables the presentation of a list of one or more patients each with a corresponding clinical process on the display. Each listed patient of the list of one or more patients is selectable and enables the presentation of a selection of interface elements on the display, each interface element representing a different mobile device functionality associated with the corresponding clinical process of the listed patient, where the selection of each interface element is configured to re-enable access to the respective different mobile device functionality associated with the corresponding clinical process of the listed patient, each mobile device functionality having a different predetermined characteristic associated with a respective selected listed patient when the at least one restricted user interface mode of the multiple user interface modes is initialized.

In accordance with a third aspect of the disclosed embodiment, wherein each fungible mobile device functionality is restricted to clinical process information related to the corresponding clinical process of the listed patient associated with each mobile device functionality.

In accordance with a third aspect of the disclosed embodiment, wherein the initialization of the at least one restricted user interface mode of the multiple user interface modes is enabled through a log-in action.

In accordance with the third aspect of the disclosed embodiment, wherein the log-in action uses a user credential.

In accordance with the third aspect of the disclosed embodiment, wherein the log-in action is an automated log-in action.

In accordance with the third aspect of the disclosed embodiment, wherein the user credential determines the selection of interface elements representing a mobile device functionality related the one process pathway.

In accordance with a third aspect of the disclosed embodiment, wherein the mobile device further has at least one unrestricted user interface mode.

In accordance with a third aspect of the disclosed embodiment, wherein the at least one user interface mode has restricted access to a set of mobile device applications relative to the at least one unrestricted user interface mode.

In accordance with a third aspect of the disclosed embodiment, wherein the at least one user interface mode has restricted access to a set of data relative to the at least one unrestricted user interface mode.

In accordance with a third aspect of the disclosed embodiment, wherein the selection of interface elements is presented from within the respective selected listed patient on the display.

In accordance with a third aspect of the disclosed embodiment, wherein the selection of each interface element is dependent on the selection of the respective selected listed patient.

In accordance with a third aspect of the disclosed embodiment, wherein the mobile device has an unrestricted user interface mode, wherein when in the unrestricted user interface mode, the processor is configured to present for selection of at least one of the interface elements outside the selection of the respective selected listed patient.

In accordance with the third aspect of the disclosed embodiment, wherein the mobile device functionality comprises a software module.

In a fourth aspect of the disclosed embodiment, a method for presenting a clinical process of a patient in a clinical facility is disclosed including generating a list of one or more patients each with a corresponding clinical process on a system backend; initializing a log-in action on a mobile device, the log-in action initializing at least one restricted user interface mode having a predetermined set of mobile device functionalities disabled; receiving the at least one list of one or more patients from the system backend on the mobile device; presenting the list of one or more patients on the mobile device, the list of one or more patients comprising a series of selectable elements; on the mobile device, selecting one of the selectable elements representing a listed patient on the mobile device; and displaying interface elements each representing a different mobile device functionality associated with the corresponding clinical process of the listed patient on the mobile device the accessibility of which is dependent upon the selection of the one selected element when the at least one restricted user interface mode of the multiple user interface modes is initialized.

In accordance with the fourth aspect of the disclosed embodiment, wherein the log-in action uses a user credential.

In accordance with a fourth aspect of the disclosed embodiment, wherein the log-in action is an automated log-in action.

In accordance with a fourth aspect of the disclosed embodiment, wherein the selection of interface elements is selectable and the selection of each interface element activates the respective mobile device functionality.

A fifth aspect of the disclosed embodiment, a system for setting up functionalities on a mobile device, the system having a network, a system backend communicable with the network comprising at least one processor, the at least one processor configured to generate one or more physical process pathways, at least one mobile device communicable with the system backend via the network, the mobile device configured to receive a portion of the one or more physical process pathways. The system backend is further configured to create a formulation of at least one functional group of mobile devices, whereby the formulation of the at least one functional group defines the at least one functional group in the system backend, wherein the at least one functional group has at least one user defined rule setting the at least one functional group of mobile devices to receive a predetermined portion of the one or more physical process pathways. The at least one functional group of mobile devices further has at least one user defined rule defining a functionality of the at least one functional group of mobile devices for the predetermined portion of the at least one of the one or more physical pathways. The system backend is configured to modify the functionality of each of the at least one mobile devices associated with the at least one functional group for the predetermined portion of the one or more physical pathways together as a group.

System in accordance with the fifth aspect of the disclosed embodiment where the modification of functionality of the at least one mobile devices is initiated by a one-step action.

System in accordance with the fifth aspect of the disclosed embodiment where the one-step action is a one-step log-in action on the mobile device.

System in accordance with the fifth aspect of the disclosed embodiment where the one-step action is an automated one-step log-in action on the mobile device.

System in accordance with the fifth aspect of the disclosed embodiment where each of the one or more physical process pathways has a predetermined characteristic shared with the functionality of the at least one functional group of mobile devices.

A sixth aspect of the disclosed embodiment, system for setting up functionalities on a mobile device, the system having a network, a system backend communicable with the network comprising at least one processor, the at least one processor configured to generate one or more physical process pathways, at least one mobile device communicable with the system backend via the network, the mobile device configured to receive a portion of the one or more physical process pathways. The system backend is further configured to create a formulation of at least one functional group of mobile devices, whereby the formulation of the at least one functional group defines the at least one functional group in the system backend, wherein the at least one functional group has at least one user defined rule setting the at least one functional group of mobile devices to receive a predetermined portion of the one or more physical process pathways. The at least one functional group of mobile devices further has at least one user defined rule defining a functionality of the at least one functional group of mobile devices for the predetermined portion of the at least one of the one or more physical pathways. The system backend is further configured to enable the modification of a predetermined characteristic of the at least one functional group, whereby effecting the predetermined portion of the one or more physical process pathways and the functionality of each of the mobile devices of the functional group together as a group.

System in accordance with the sixth aspect of the disclosed embodiment where the modification of a predetermined characteristic of the at least one functional group of the at least one mobile devices is initiated by a one-step action.

System in accordance with the sixth aspect of the disclosed embodiment where the one-step action is a one-step log-in action on the mobile device.

System in accordance with the sixth aspect of the disclosed embodiment where the one-step action is an automated one-step log-in action on the mobile device.

A seventh aspect of the disclosed embodiment, a system for setting up functionalities on a mobile device, the system having a network, a system backend communicable with the network comprising at least one processor, the at least one processor configured to generate one or more physical process pathways, at least one mobile device communicable with the system backend via the network, the mobile device having at least one built in functionality and configured to receive at least one of the one or more physical process pathways. The system backend is further configured to create a formulation of at least one functional group of mobile devices, whereby the formulation of the at least one functional group defines the at least one functional group in the system backend, wherein the at least one functional group has at least one user defined rule disabling at least one of the built-in functionalities of the at least one mobile device for at least one of the one or more physical process pathways. The at least one mobile device is further configured present at least one of the one or more physical process pathways, where the each of the mobile devices associated with the at least one functional group is further configured to each disable at least one of the built-in functionalities for at least one of the one or more physical pathways in accordance to its respective functional group.

System in accordance with the seventh aspect of the disclosed embodiment where the mobile device is further configured to initiate a one-step action to disable the at least one of the built-in functionalities.

System in accordance with the seventh aspect of the disclosed embodiment where the one-step action is a one-step log-in action on the mobile device.

System in accordance with the seventh aspect of the disclosed embodiment where the one-step action is an automated one-step log-in action on the mobile device.

System in accordance with the seventh aspect of the disclosed embodiment where each of the one or more physical process pathways has a predetermined characteristic shared with the functionality of the at least one functional group of mobile devices.

An eight aspect of the disclosed embodiment, a system for setting up functionalities on a mobile device, the system having a network, a system backend communicable with the network comprising at least one processor, the at least one processor configured to generate one or more physical process pathways, at least one mobile device communicable with the system backend via the network, the mobile device configured to receive a portion of the one or more physical process pathways. The system backend is further configured to create a formulation of at least one functional group of mobile devices, whereby the formulation of the at least one functional group defines the at least one functional group in the system backend, wherein the at least one functional group has at least one user defined rule setting the at least one functional group of mobile devices to receive a predefined portion of the one or more physical process pathways. The at least one functional group of mobile devices further has at least one user defined rule defining a functionality of the at least one functional group of mobile devices for the at least one of the one or more physical pathways. The system backend is further configured to modify the functionality of each of the at least one mobile devices associated with the at least one functional group for the portion of the one or more physical pathways in accordance with the at least one mobile device's respective functional group, where the modification of functionality of the at least one mobile devices is initiated by a substantially one-step action.

System in accordance with the eighth aspect of the disclosed embodiment where the one-step action is a one-step log-in action on the mobile device.

System in accordance with the eighth aspect of the disclosed embodiment where the one-step action is an automated one-step log-in action on the mobile device.

System in accordance with the eighth aspect of the disclosed embodiment where each of the one or more physical process pathways has a predetermined characteristic shared with the functionality of the at least one functional group of mobile devices.

In a ninth aspect of the disclosed embodiment, a system for presenting a clinical process of a patient in a clinical facility is disclosed having a network; and a system backend communicable with the network configured to generate a list of one or more patients each with a corresponding clinical process, each listed patient defining a patient module encapsulating a set of clinical process information of the respective listed patient and a set of functions configured to manipulate at least a portion of the set of clinical process information by controlling a functionality of at least one mobile device. The at least one mobile device is communicable with the system backend via the network and comprising a mobile processor and a display, the mobile processor is configured to present the list of one or more patients and each associated patient module and the set of functions associated with each associated patient module controlling the functionality of the at least one mobile device. The system backend further provides an application programming interface (API) configured to enable a third party user to communicate with the system backend via the network and to receive at least a portion of the set of clinical process information from the patient module associated with a predetermined patient, the API further being configured to enable the third party user to present the predetermined patient and the portion set of clinical process information.

In a tenth aspect of the disclosed embodiment, a method for presenting a clinical process of a patient in a clinical facility is disclosed including generating a list of one or more patients each with a corresponding clinical process, each patient listing defining a patient module; providing each patient module with a set of clinical process information of the respective listed patient, and a set of functions configured to manipulate at least a portion of the set of clinical process information by controlling a functionality of at least one mobile device; providing an application programming interface (API) configured to enable a third party user to communicate with the system backend with the network and to receive at least a portion of the set of clinical process information from the patient module associated with a predetermined listed patient; providing the list of one or more patients to the at least one mobile device, the list of one or more patients comprising a series of selectable elements on a mobile device; providing the at least a portion of the set of clinical process information from the patient module associated with the predetermined listed patient to the third party user via the API.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A computer-implemented method, comprising:
   initializing a login action on a mobile device;
   initializing a restricted user interface mode on the mobile device based on the login action;
   receiving, from a backend server, a list of physical process pathways;
   presenting, on a display of the mobile device, the list of physical process pathways;
   enabling selection of a first physical process pathway of the list of physical process pathways; and
   configuring a user interface of the mobile device to present a set of user interface elements corresponding to a set of mobile device functionalities corresponding to the first physical process pathway, wherein the restricted user interface mode defines which individual ones of the set of user interface elements corresponding to the set of mobile device functionalities are included in the user interface.

2. The computer-implemented method of claim 1, wherein at least some physical process pathways of the list of physical process pathways correspond to physical work activities to be achieved with respect to a patient.

3. The computer-implemented method of claim 1, wherein the mobile device is one of a plurality of fungible mobile devices, and wherein initializing the login action comprises:
   authenticating a set of user credentials associated with a user of the mobile device; and
   in accordance with a determination that the set of user credentials are authenticated, opening a particular application on the mobile device.

4. The computer-implemented method of claim 3, wherein the restricted user interface mode comprises a mode within the particular application.

5. The computer-implemented method of claim 1, wherein the set of user interface elements correspond to a set of patient elements, with each user interface element of the set of user interface elements being associated with a patient.

6. The computer-implemented method of claim 1, wherein initializing the login action comprises sending a login indication to the backend server, the login indication indicating a previous login attempt into a user account with a user of the mobile device, wherein the login indication is configured to enable the backend server to associate the user with the mobile device by at least updating an entry in a dynamic table.

7. A mobile device, comprising:
   a memory configured to store computer-executable instructions; and
   a processor configured to access the memory and execute the computer-executable instructions to perform operations comprising:
   initializing a login action on the mobile device;
   initializing a restricted user interface mode on the mobile device based on the login action;
   receiving, from a backend server, a list of physical process pathways;
   presenting, on a display of the mobile device, the list of physical process pathways;
   enabling selection of a first physical process pathway of the list of physical process pathways; and
   configuring a user interface of the mobile device to present a set of user interface elements corresponding to a set of mobile device functionalities corresponding to the first physical process pathway, wherein the restricted user interface mode defines which individual ones of the set of user interface elements corresponding to the set of mobile device functionalities are included in the user interface.

8. The mobile device of claim 1, wherein at least some physical process pathways of the list of physical process pathways correspond to physical work activities to be achieved with respect to a patient.

9. The mobile device of claim 1, wherein the mobile device is one of a plurality of fungible mobile devices, and wherein initializing the login action comprises:
   authenticating a set of user credentials associated with a user of the mobile device; and
   in accordance with a determination that the set of user credentials are authenticated, opening a particular application on the mobile device.

10. The mobile device of claim 9, wherein the restricted user interface mode comprises a mode within the particular application.

11. The mobile device of claim 1, wherein the set of user interface elements correspond to a set of patient elements, with each user interface element of the set of user interface elements being associated with a patient.

12. The mobile device of claim 1, wherein initializing the login action comprises sending a login indication to the backend server, the login indication indicating a previous login attempt into a user account with a user of the mobile device, wherein the login indication is configured to enable the backend server to associate the user with the mobile device by at least updating an entry in a dynamic table.

13. One or more non-transitory computer-readable media comprising computer-executable instructions that, when executed by one or more processors of a mobile device, cause the mobile device to perform operations comprising:
   initializing a login action on the mobile device;
   initializing a restricted user interface mode on the mobile device based on the login action;
   receiving, from a backend server, a list of physical process pathways;
   presenting, on a display of the mobile device, the list of physical process pathways;
   enabling selection of a first physical process pathway of the list of physical process pathways; and
   configuring a user interface of the mobile device to present a set of user interface elements corresponding to a set of mobile device functionalities corresponding to the first physical process pathway, wherein the restricted user interface mode defines which individual ones of the set of user interface elements corresponding to the set of mobile device functionalities are included in the user interface.

14. The one or more non-transitory computer-readable media of claim 13, wherein at least some physical process pathways of the list of physical process pathways correspond to physical work activities to be achieved with respect to a patient.

15. The one or more non-transitory computer-readable media of claim 13, wherein the mobile device is one of a plurality of fungible mobile devices, and wherein initializing the login action comprises:
authenticating a set of user credentials associated with a user of the mobile device; and
in accordance with a determination that the set of user credentials are authenticated, opening a particular application on the mobile device.

16. The one or more non-transitory computer-readable media of claim 15, wherein the restricted user interface mode comprises a mode within the particular application.

17. The one or more non-transitory computer-readable media of claim 13, wherein the set of user interface elements correspond to a set of patient elements, with each user interface element of the set of user interface elements being associated with a patient.

18. The one or more non-transitory computer-readable media of claim 13, wherein initializing the login action comprises sending a login indication to the backend server, the login indication indicating a previous login attempt into a user account with a user of the mobile device, wherein the login indication is configured to enable the backend server to associate the user with the mobile device by at least updating an entry in a dynamic table.

19. The one or more non-transitory computer-readable media of claim 13, wherein the mobile device is fungible with respect to other mobile devices.

20. The one or more non-transitory computer-readable media of claim 13, wherein initializing the login action on the mobile device comprises:
receiving input login information as part of at least one of a one-step action or a quick launch action;
sending the login information with the backend server; and
receiving a confirmation from the backend server, the confirmation indicating that successful login into the mobile device and programmatically configuring an operational capability of the mobile device.

* * * * *